US011852768B2

(12) United States Patent
Ahmed et al.

(10) Patent No.: US 11,852,768 B2
(45) Date of Patent: Dec. 26, 2023

(54) MULTIMODAL APPROACH TO TARGET STRATIGRAPHIC PLAYS THROUGH SEISMIC SEQUENCE STRATIGRAPHY, ROCK PHYSICS, SEISMIC INVERSION AND MACHINE LEARNING

(71) Applicant: Saudi Arabian Oil Company, Dhahran (SA)

(72) Inventors: Mukarram Ahmed, Dhahran (SA); Aiman M. Bakhorji, Dhahran (SA); Faisal O. Hakeem, Dammam (SA); Syed Sadaqat Ali, Dhahran (SA); Waleed M. Gharbi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 126 days.

(21) Appl. No.: 17/531,387

(22) Filed: Nov. 19, 2021

(65) Prior Publication Data
US 2023/0161062 A1 May 25, 2023

(51) Int. Cl.
*G01V 1/30* (2006.01)
*G01V 1/28* (2006.01)
(Continued)

(52) U.S. Cl.
CPC ............. *G01V 1/306* (2013.01); *G01V 1/282* (2013.01); *G01V 1/302* (2013.01); *G01V 99/005* (2013.01); *G06N 20/00* (2019.01)

(58) Field of Classification Search
CPC ........ G01V 1/306; G01V 1/282; G01V 1/302; G01V 99/005; G06N 20/00
See application file for complete search history.

(56) References Cited

U.S. PATENT DOCUMENTS 5,136,551 A    8/1992 Armitage
5,475,589 A   12/1995 Armitage
(Continued)

FOREIGN PATENT DOCUMENTS

CN    102540256 A    7/2012
CN    103217714 B    4/2015
(Continued)

OTHER PUBLICATIONS

Internation Search Report and Written Opinion in corresponding PCT Application No. PCT/US2022/079962, dated Feb. 23, 2023; 14 pages.
(Continued)

*Primary Examiner* — Mischita L Henson
(74) *Attorney, Agent, or Firm* — Leason Ellis LLP

(57) ABSTRACT

Computer-implemented stratigraphic play quality generation is disclosed. Stratigraphic data can be processed from each of a plurality of respective data sources to generate conditioned stratigraphic data. From at least some of the conditioned stratigraphic data, attributes of at least one seismic sequence can be extracted, and at least one seismic surface and at least one structural element associated with at least some of the conditioned stratigraphic data can be determined. At least some of the conditioned stratigraphic data representing sedimentary layers can be correlated with seismic reflection data to ascertain a subsurface of the geologic area at a respective depth. Reservoir properties associated with the geologic area are linked to elastic properties, and a 2D model built. Moreover, 3D map can be generated that is usable for a prospective drilling plan.

20 Claims, 28 Drawing Sheets
(14 of 28 Drawing Sheet(s) Filed in Color)

(51) Int. Cl.
*G06N 20/00* (2019.01)
*G01V 99/00* (2009.01)

(56) References Cited

U.S. PATENT DOCUMENTS

| | | | |
|---|---|---|---|
| 6,560,540 | B2 | 5/2003 | West et al. |
| 8,360,144 | B2 | 1/2013 | Imhof |
| 8,612,156 | B2 | 12/2013 | Gulati |
| 8,873,334 | B2 | 10/2014 | Thompson et al. |
| 9,194,968 | B2 | 11/2015 | Imhof et al. |
| 10,713,398 | B2 * | 7/2020 | Mezghani ............ G01V 99/005 |
| 10,948,618 | B2 | 3/2021 | Bandura et al. |
| 10,996,372 | B2 | 5/2021 | Denli et al. |
| 2011/0295510 | A1 | 12/2011 | Gulati |
| 2013/0297272 | A1 * | 11/2013 | Sung ................ G01V 11/00 703/10 |
| 2019/0383965 | A1 | 12/2019 | Salman et al. |
| 2020/0088897 | A1 | 3/2020 | Roy et al. |
| 2020/0183047 | A1 | 6/2020 | Denli et al. |

FOREIGN PATENT DOCUMENTS

| | | |
|---|---|---|
| CN | 108363100 A | 8/2018 |
| CN | 111596364 A | 8/2020 |
| WO | 2021113091 A1 | 6/2021 |

OTHER PUBLICATIONS

Mansurbeg Howri et al: "De-risking Plays in the Highly Folded Zone Foreland Basin of the Zagros Fold-Thrust Belt, Kurdistan Region, Iraq" In: "Tectonic and Structural Framework of the Zagros Fold-Thrust Belt", Jan. 1, 2019 (Jan. 1, 2019), Elsevier, XP093022893, ISSN: 2542-9000 ISBN: 978-0-12-815048-I vol. 3, pp. 245-254, DOI: 10.1016/B978-0-12-815048-1.00011-I, Retrieved from the Internet: URL:http://dx.doi.org/10.1016/B978-0-12-815048-1.00011-1> p. 245, paragraph 1—p. 254, figures 11.1-11.6 ; 10 pages.

Shi et al., "High-order AVO inversion for effective porefluid bulk modulus based on series reversion and bayesian theory", Energies, Mar. 2020.

* cited by examiner

MULTIMODAL APPROACH TO TARGET STRATIGRAPHIC PLAYS THROUGH SEISMIC SEQUENCE STRATIGRAPHY, ROCK PHYSICS, SEISMIC INVERSION AND MACHINE LEARNING

FIELD OF THE DISCLOSURE

This patent application relates, generally, seismic targeting and, more particularly, to targeting stratigraphic plays based on an integrated framework of a plurality of domains.

BACKGROUND OF THE DISCLOSURE

Many structural traps have been drilled for hydrocarbon exploration in sedimentary basins around the world. Stratigraphic traps are challenging to discover and drill, as they are often formed by a complex interplay of sedimentological processes, eustasy and regional tectonics. Moreover, targeting structural traps in both clastic and carbonate settings remains problematic, at least in part due to complexities in seismic geomorphology and amplitude-variation-with-offset ("AVO") inversion. These and other complexities make identifying and evaluating prospective stratigraphic features and reservoir sequences for respective hydrocarbon potentials difficult. Traditional approaches to locate and evaluate structural traps have been inefficient, slow, or expensive.

Further, poor seismic data quality can yield false traps and or features, that are attributed to seismic acquisition or imaging artifacts.

It is with respect to these and other concerns that the present disclosure is provided.

SUMMARY OF THE DISCLOSURE

In one or more implementations, computer-implemented stratigraphic play quality generation is disclosed. At least one computing device configured by executing instructions can process respective stratigraphic data from each of a plurality of respective data sources to generate conditioned stratigraphic data. The stratigraphic data can be associated with a geologic area. The at least one computing device can extract from at least some of the conditioned stratigraphic data, attributes of at least one seismic sequence, and can determine at least one seismic surface and at least one structural element associated with at least some of the conditioned stratigraphic data as a function of structural interpretation. Further, the at least one computing device can correlate at least some of the conditioned stratigraphic data representing sedimentary layers with seismic reflection data to ascertain a subsurface of the geologic area at a respective depth. Moreover, the at least one computing device can link reservoir properties associated with the geologic area to elastic properties associated with the geologic area, and build, using at least some of the conditioned stratigraphic data associated with core sequences and log sequences, a 2D model which represents a hydrocarbon potential of at least one stratigraphic feature of interest associated with the geologic area. Moreover, the at least one computing device can generate, as a function of the 2D model, a 3D map that is usable for a prospective drilling plan.

In one or more implementations, at least one computing device can use at least one of seismic sequence stratigraphy, rock physics, seismic inversion, and machine learning for extracting the attributes of at least one seismic sequence, determining the at least one seismic surface and the at least one structural element, ascertaining the subsurface of the geologic area, linking the reservoir properties to elastic properties, building the 2D model, and generating the 3D map.

In one or more implementations, conditioning the stratigraphic data includes at least one of seismic data conditioning and log data conditioning, wherein the seismic data and log data are 1D.

In one or more implementations, the at least one computing device can de-risk the stratigraphic data. Extracting seismic attributes can include applying, by the at least one computing device, spectral decomposition and color blending. Further, the structural interpretation can include defining a basin structural framework, and representing, by the at least one computing device, horizon and fault interpretations.

In one or more implementations, the at least one computing device can apply seismic inversion to identify a feature of interest.

In one or more implementations, the at least one computing device can generate an image of a stratigraphic play, and blend the image of the stratigraphic play with seismic derived reservoir properties to highlight targeted areas.

In one or more implementations, the at least one computing device can isolate a potential stratigraphic play area and/or features.

Additional features, advantages, and embodiments of the disclosure may be set forth or apparent from consideration of the detailed description and drawings. It is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

DETAILED DESCRIPTION OF CERTAIN EMBODIMENTS ACCORDING TO THE DISCLOSURE

By way of overview and introduction, the present disclosure presents technical method(s) and system(s) which provide integrated solutions to target stratigraphic anomalies in both clastic and carbonate settings, including petroleum systems. Regional geological sequences can be correlated and mapped in accordance with the teachings herein, and structural interpretations can be integrated therewith, for example, using geometric seismic attributes and one or more core descriptions. Moreover, prospective stratigraphic features and reservoir sequences can be evaluated for hydrocarbon potential using stratigraphic attributes as a function of seismic geomorphology and AVO inversion. Good integration of different geoscience domains is, therefore, useful for detecting and analyzing structural trap formations.

In one or more implementations, seismic forward models based on detailed rock physics can be integrated with sequence stratigraphy principals to map geological sequences, such as onlaps, down laps, reworked sediments, channels, or most seismically interpretable clastic or carbonate features, on seismic amplitudes. Machine learning, including tools providing three-dimensional seismic interpretation, can be used to refine interpretation, for example, to delineate and map geobodies, and for picking higher order seismic sequences. This helps update seismic AVO inversion information and mapping features of interest. Once mapped, a detailed prospect analysis can be performed on one or more sequence features, including for both clastic and carbonate settings.

The present disclosure includes a plurality of systems and processes which target stratigraphic plays with specificity and overcome several challenges in identifying the geological features that are associated with stratigraphic traps. As used herein, the term "stratigraphic traps" refers, generally, as rock formations that contain hydrocarbons and that are encapsulated by surrounding low permeability rock formations. The present disclosure includes systems and methods to combine rock physics and seismic inversion with machine learning, thereby providing new dimensions to working with seismic sequence stratigraphy and to identify stratigraphic traps. In one or more implementations, a workflow is provided that includes an integrated approach to target stratigraphic plays using data comprised in one or more of one-dimensional ("1D"), two-dimensional ("2D"), and three-dimensional ("3D") data sources, such as cores, logs and seismic data, thereby providing insights and information from a regional basin scale and down to specific target reservoir(s). Thus, the present disclosure includes the use of core integrated seismic quantitative interpretations to understand sedimentary rocks from depositional environments, to lithology distribution, and to a process by which such rocks can be classified into prospective plays.

Figure 1:
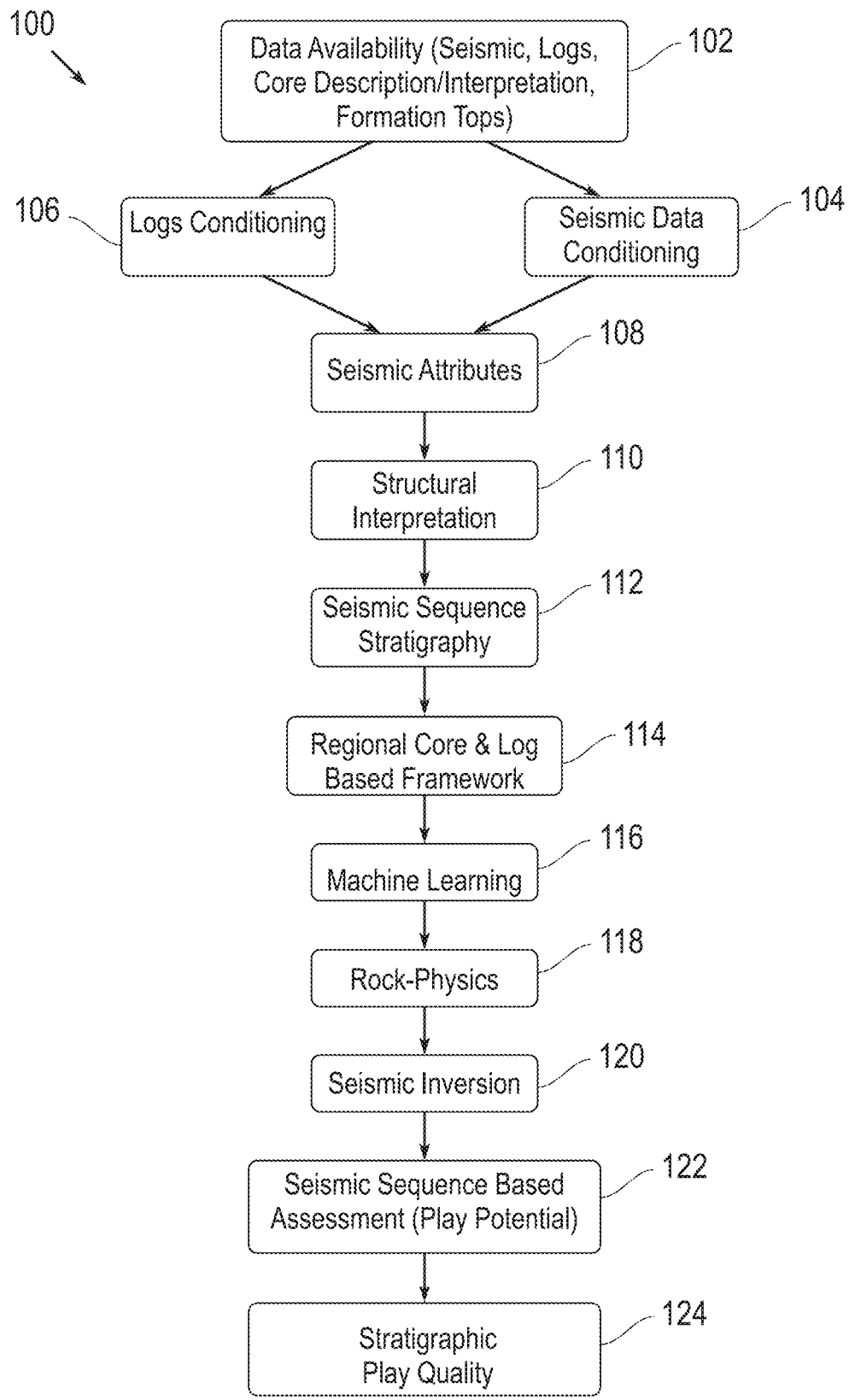
FIG. 1 is a flow diagram showing a routine that illustrates a broad aspect of the present disclosure, in accordance with one or more embodiments.

Turning now to FIG. 1, a flow diagram is described showing a routine 100 that illustrates a broad aspect of a method for stratigraphic play analysis, in accordance with one or more embodiments of the present disclosure. It is to be appreciated that several of the logical operations described herein can be implemented as a sequence of computer-implemented acts or program modules running on one or more computing devices. Accordingly, the operations described herein, including logical operations, are referred to variously as operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

In accordance with the algorithmic steps in the example high-level process shown in FIG. 1, a series of elements can be processed for evaluating hydrocarbon potential, including to risk and grade stratigraphic play quality. Programmatic instructions that are executed by one or more computing devices can condition data, such as to normalize, correct, match, integrate, or otherwise process data within one or more data sources. In addition, various interpretations, such as regional to area-specific interpretations, of the conditioned data can be made for representing the sequence stratigraphy. For example, several 3D seismic attributes can be generated, which facilitate interpretations of geological sequences. Moreover, core and wireline data interpretations can identify different rock units and their salient properties.

Furthermore, and with reference to the algorithmic steps in the example processes shown in FIG. 1, machine learning can be used for interpreting seismic horizons at several layers, as well as to generate seismic facies automatically, including via unsupervised classification processes. Seismic and log interpretations can be used to conduct seismic inversion and rock physics analysis to detect and represent the effect of hydrocarbons on rock layers through various elastic attributes. Various processes executing on one or more computing devices integrate respective findings with other data sources, such as regional basin studies, for facilitating mapping processes of areas and features of particular stratigraphic interest. Depending upon the particular play concept, e.g., clastic or carbonate, regional studies can result in a variety of data and data types. Hydrocarbon potential can be evaluated and risked, including to grade the stratigraphic play quality, based on feature(s) within a geologic area that are mapped in 3D, including by using rock physics and seismic inversion elastic attributes.

Continuing with reference to FIG. 1, example workflows and processes are shown that include a multimodal integrated approach to target stratigraphic plays, covering a plurality of key elements. At step 102, a data availability workflow includes an integrated approach for handling various 1D, 2D, and 3D data. For example, cataloging data as seismic information, log data, core descriptions and interpretations, and formation tops can be made for one or more respective target areas. In addition, processes operate on one or more computing devices for log conditioning 104 and seismic conditioning 106. Further, one or more missing data elements can be highlighted or otherwise handled, to ensure that missing elements are identified, accessed, and used in accordance with the present disclosure, such as for identifying potential quality of stratigraphic plays. Data processing flows can occur for seismic attributes 108, structural interpretation 110, and seismic sequence stratigraphy 112. Moreover, data processing flows can occur for a regional core and log-based framework 114. Machine learning processes 116 and rock physics 118 can, thereafter, be used to determine seismic inversion 120, seismic sequence-based assessment, such as for play potential 122, and thereafter determinations of stratigraphic play quality 124.

Figure 2A:
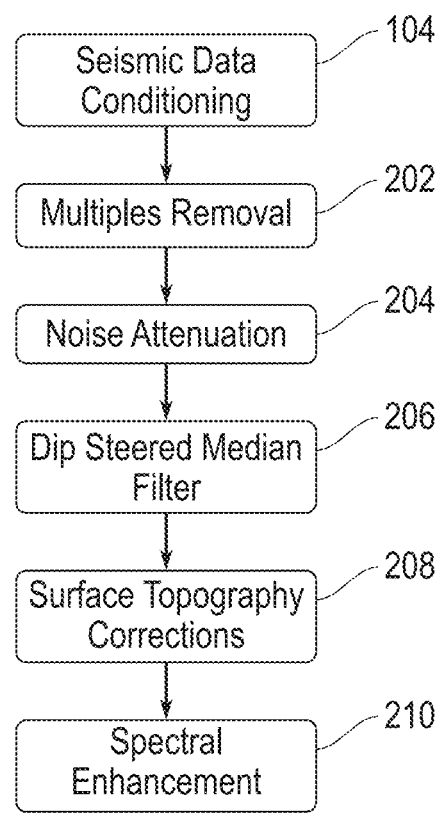
FIG. 2A is a flow diagram illustrating an example routine that includes steps associated seismic data conditioning, in accordance with one or more embodiments of the present disclosure.

Referring now to FIG. 2A, a flow diagram is shown illustrating an example routine that includes steps associated seismic data conditioning 104. A principal goal associated with routine 104 is to provide good seismic image quality for interpretational workflows. Seismic data, including land seismic data, can be tainted with multiples, which can often result in false interpretations. Similarly, signal to noise ratio can hinder understanding of a seismic amplitude character. Both of these challenges can be handled by using advanced imaging techniques. For example, dip steered filters can be used for removing random noise as well as to enhance the lateral seismic event by filtering the structural dip. This can be particularly useful for stratigraphic play interpretations. Poor near surface solutions can also negatively affect a seismic interpretation, often resulting in a false sense of structural highs or elements that would otherwise be interpreted as stratigraphic in nature. Still further, full bandwidth frequency is useful to help illuminate deep targets and broadband seismic data, which can be ideal for such workflow.

Figure 2B:
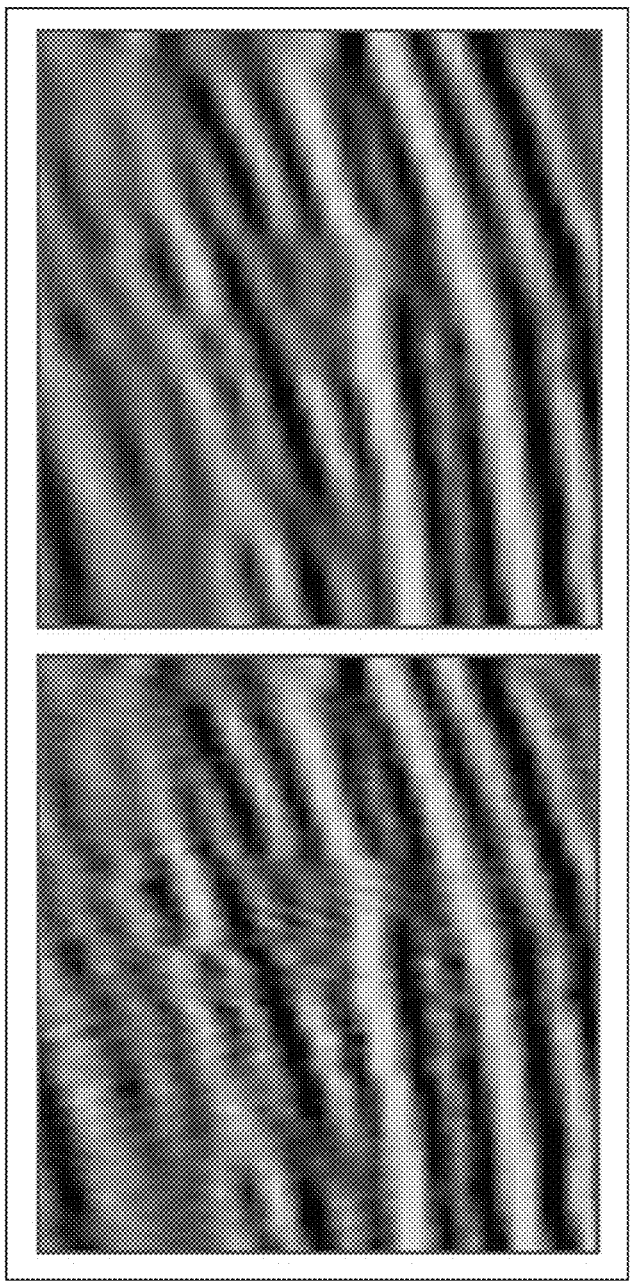
FIG. 2B illustrates image improvement by applying a dip steered median filter when applied to seismic data, in accordance with one or more embodiments of the present disclosure.

Accordingly, and with reference to the example process shown in FIG. 2A, seismic data conditioning steps can include multiples removal 202, noise attenuation 204, dip steered media filtering 206, surface topography corrections 208, and spectral enhancement 210. FIG. 2B illustrates image improvement by applying a dip steered median filter when applied to seismic data. In the example shown in FIG. 2B, the "BEFORE" portion shows considerably more noise than in the "AFTER" portion.

Figure 3A:
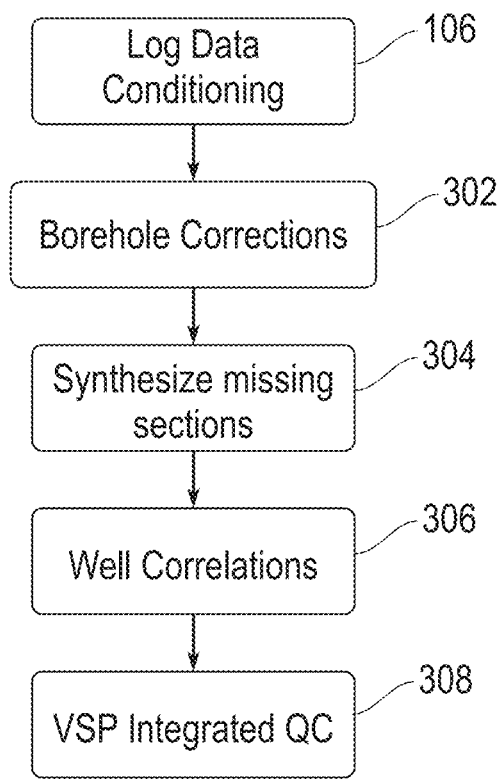
FIG. 3A is a flow diagram illustrating an example routine that includes steps associated with log data conditioning, in accordance with one or more embodiments of the present disclosure.

Referring now to FIG. 3A, a flow diagram is shown illustrating an example routine that includes steps associated with log data conditioning 106. Wireline data can be affected, for example, from borehole conditions, which should be corrected prior to integrating the wireline data with seismic-based workflows. Steps associated with log data conditioning include correcting key geophysical logs, such as the density, compressional sonic, and shear sonic from poor borehole conditions, as well as de-spiking, and synthesizing one or more missing sections using either suitable empirical methods or, alternative, using machine learning methods. Once the logs covering a large time-window are corrected, they can be correlated in both time and depth to ensure that geological markers are consistently picked for identifying various rock units. Moreover, generated or synthetic well log data can be compared and/or integrated with a vertical seismic profiling ("VSP") generated corridor stack to highlight the log editing quality. Such comparison can also be used to the response of primary reflectors, when compared with actual 3D seismic data across the same well.

Accordingly, and with reference to the example process shown in FIG. 3A, log data conditioning steps 106 can include borehole corrections 304, synthesizing missing sections 306, well correlations 308, and VSP integrated quality control ("QC") 310. Log Data Conditioning—In step 302, measure wireline data is corrected to account for borehole conditions, such as tool specific recording and environmental conditions, borehole rugosity, and drilling mud invasion into the formation corrections, which can negatively affect the recorded data. Sometimes a measurement made on specific zones or the recorded data is rendered poorly and does not represent the actual lithological formation accurately. In step 304, missing or bad log wireline data are predicted (e.g., synthesized) using, for example, imperial, statistical or machine learning methods. Once predictions are made, recorded sections are correlated to ensure that lithological units across wells are relatable and log responses are similar or interpretable to reservoir properties (step 306). If any of the wells have recorded borehole seismic data (VSP) then, in step 308, well time that is synthetically generated is compared with the measured VSP corridor stack. This ensures that the seismic events are correlated across these two different data sets, increases confidence in the accuracy of the well log edits, and helps to identify whether there is any major issue with the data.

Figure 3B:
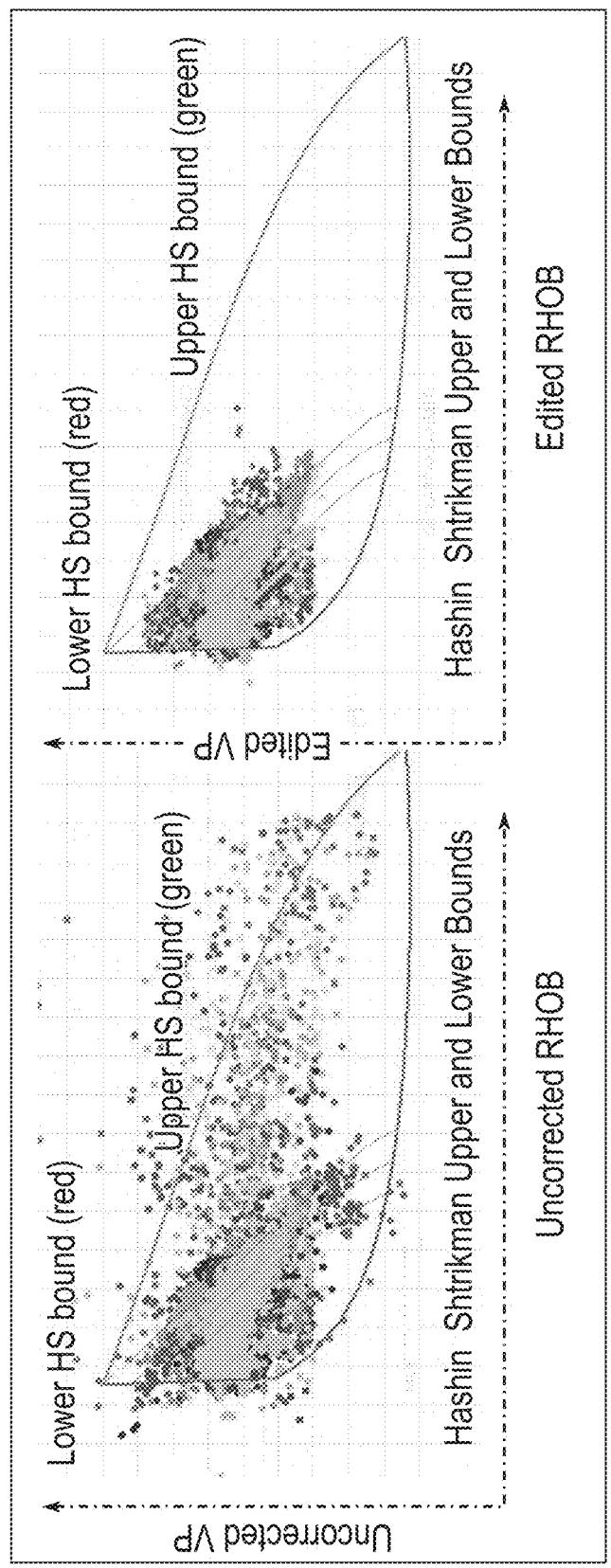
FIG. 3B illustrates two graphs representing improvements associated with log data conditioning, in accordance with one or more embodiments of the present disclosure.

FIG. 3B illustrates two graphs representing improvements associated with log data conditioning 106. As shown in FIG. 3B, a graph of uncorrected RHOB data (along the x-axis) and uncorrected VP data (along the y-axis), and a graph of edit RHOB data (along the x-axis) and edited VP data (along the y-axis). As used herein, RHOB refers, generally, to the bulk-density of a rock, including the total mass of the rock, its constituting matrix, the porous space, and the fluid within those porous space. As used herein, VP refers, generally, to the compressional velocity of a rock, which reflects the measurement of sound waves passing through the rock itself. Both of these properties can be measured by wireline data and help define the rock type and its constituents. Borehole conditions can affect these measurements and produce unrealistic rock characteristics and, in response, logs can be edited using known rock physics principals. Corrected logs can be used for seismic workflows. The two graphs shown in FIG. 3B identify improvements resulting from steps associated with log data conditioning 106.

Figure 4A:
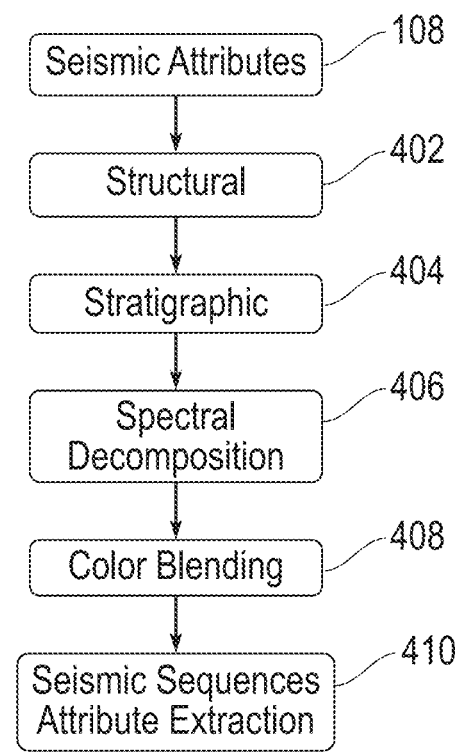
FIG. 4A is a flow diagram illustrating an example routine that includes steps associated with ascertaining seismic attributes, in accordance with one or more embodiments of the present disclosure.

Referring now to FIG. 4A, a flow diagram is shown illustrating an example routine that includes steps associated with determining seismic attributes 108. Identifying seismic attributes can be integral to various quantitative seismic interpretational workflows. In one or more implementations of the present disclosure, several parameters can be derived from the seismic attributes, such as frequency, attenuation, amplitude character, time, or the like, which contribute to understanding of subsurface geology. Seismic attributes can be sub-divided into structural and stratigraphic types, and blending processes of seismic attributes contribute to highlighting and illuminating features of stratigraphic interest. Sequence stratigraphy is based on interplay of three components: tectonics, eustacy and sediment supply. With regard to tectonics, structural attributes play an important role. Geometric seismic attributes, which form the main types of structural attributes, can be used for highlighting structural detail and, perhaps to a lesser extent, stratigraphic details. Geometric attributes provide data that show only part of the information of interest embedded in seismic data to focus on seismic response for imaging structures. Stratigraphic attributes, on the on the other hand, largely rely on either a RGT (relative geologic time model) or on multi-attribute blending, as the features hidden in stratigraphic details are normally well under seismic resolution. Thus, innovative techniques such as decomposing the signal into component frequencies and blending them using RGB blend help reveal features not visible in seismic or derived attributes. Thus, both structural (linked to tectonics) and stratigraphic (linked to sediment supply and depositional environment) attributes contribute to the example process flow of FIG. 4A. Moreover, the present disclosure includes processes that execute on one or more computing devices to map such features, which can identify and correlate one or more geo-bodies with seismic sequence stratigraphy principals. This further contributes to improved accuracy in identifying hydrocarbon potential. Seismic attributes can be also extracted at different time horizons levels, thereby enabling one or more computing devices to ascertain the evolution of the depo-space over time.

Accordingly, and with reference to the example attributes and processes shown in FIG. 4A, including seismic attributes 108 can include structural attributes 402, stratigraphic attributes 404, spectral decomposition 406, color blending 408, and seismic sequences attribute extraction 410. Two conventional types of attributes used in industry include structural and stratigraphic attributes. Structural attributes (402), such as coherence, semblance, variance and local dip and azimuth, make up the family of attributes conventionally referred to as "edge attributes," which are used for highlighting structural details in seismic data. Spectral decomposition 406 aids primarily to illuminate the stratigraphic details such as channels and facies change in the seismic data. Color blending 408 (e.g., red, green, and blue ("RGB") blending includes an additive color model that adds the information from RGB colors represented by discrete frequencies. RGB blends increase the dynamic range using color information for otherwise band-limited seismic data, which helps the interpreter to reveal unprecedented details. Seismic Sequence attributes 410, unlike structural and stratigraphic attributes, are not directly derived from seismic data, but rather from a relative geological time volume created by interpreting the horizons trough out the seismic data volume. Thinning attribute is an example that helps identify the unconformities and stratigraphic terminations and features such as downlap and onlap.

Figure 4B:
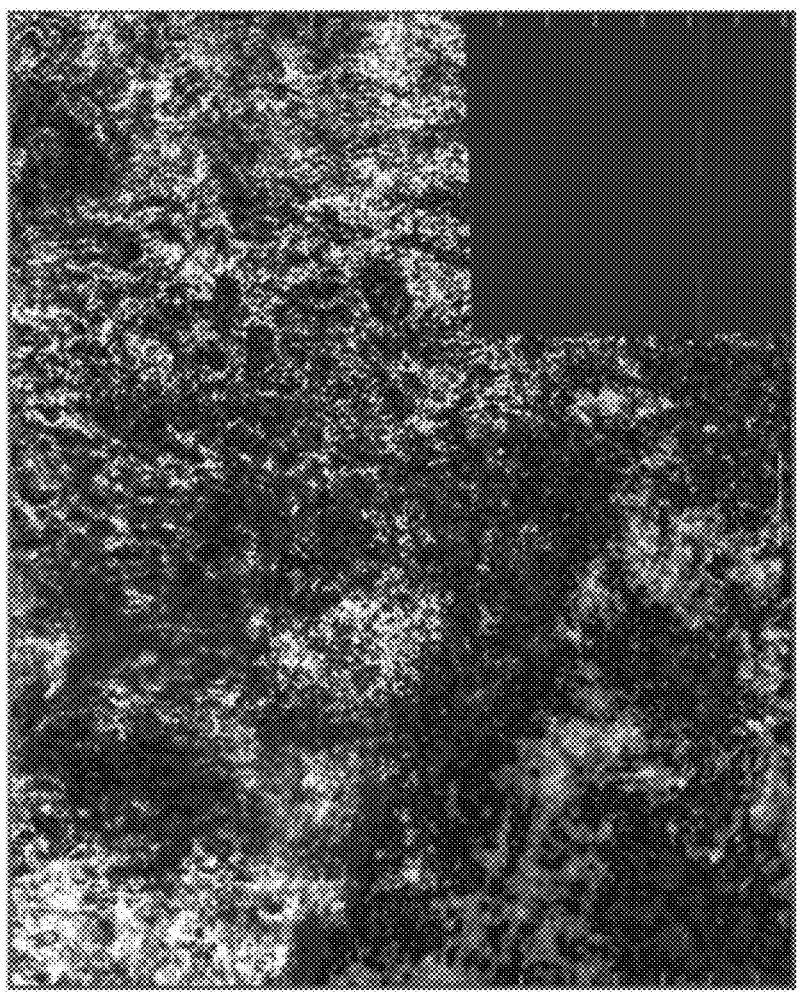
FIG. 4B illustrates an example of seismic attributes, such as envelop, illuminating different features of geological interest, in accordance with one or more embodiments of the present disclosure.
Figure 4C:
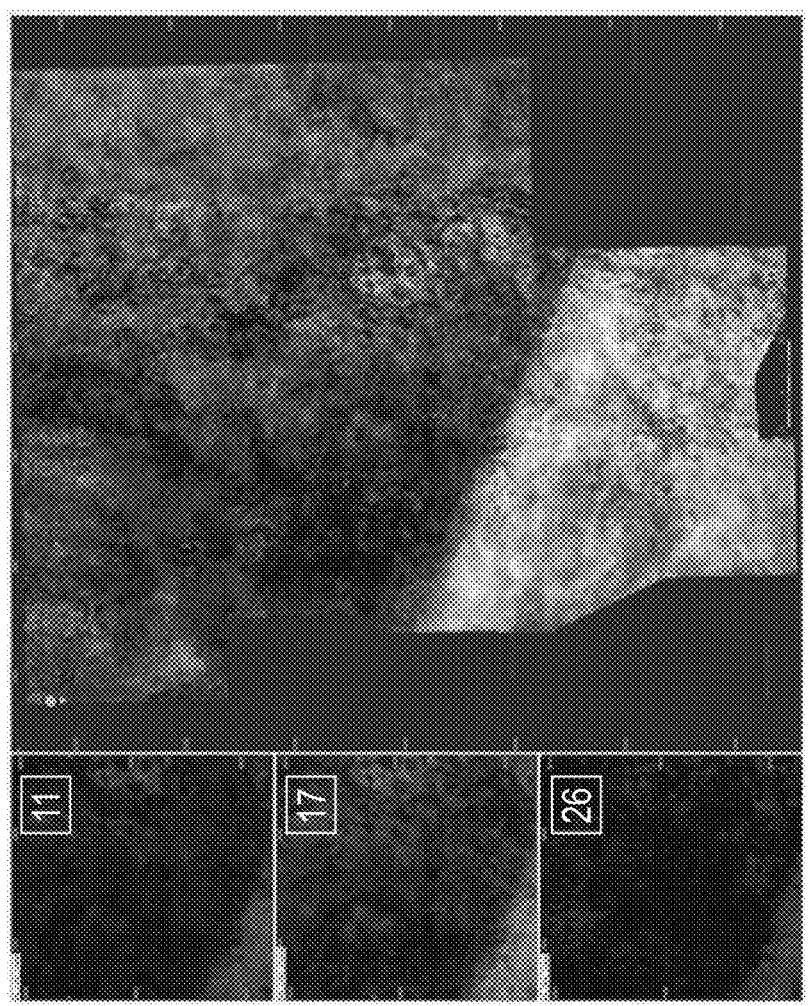
FIG. 4C illustrates an example of frequency blending, in accordance with one or more embodiments of the present disclosure.

FIG. 4B illustrates an example of seismic attributes, such as envelop, illuminating different features of geological interest. FIG. 4C illustrates an example of frequency blending. In the example shown in FIG. 4C, frequencies at 11-17 & 26 Hz are blended to highlight different geological features at the target level.

Figure 5A:
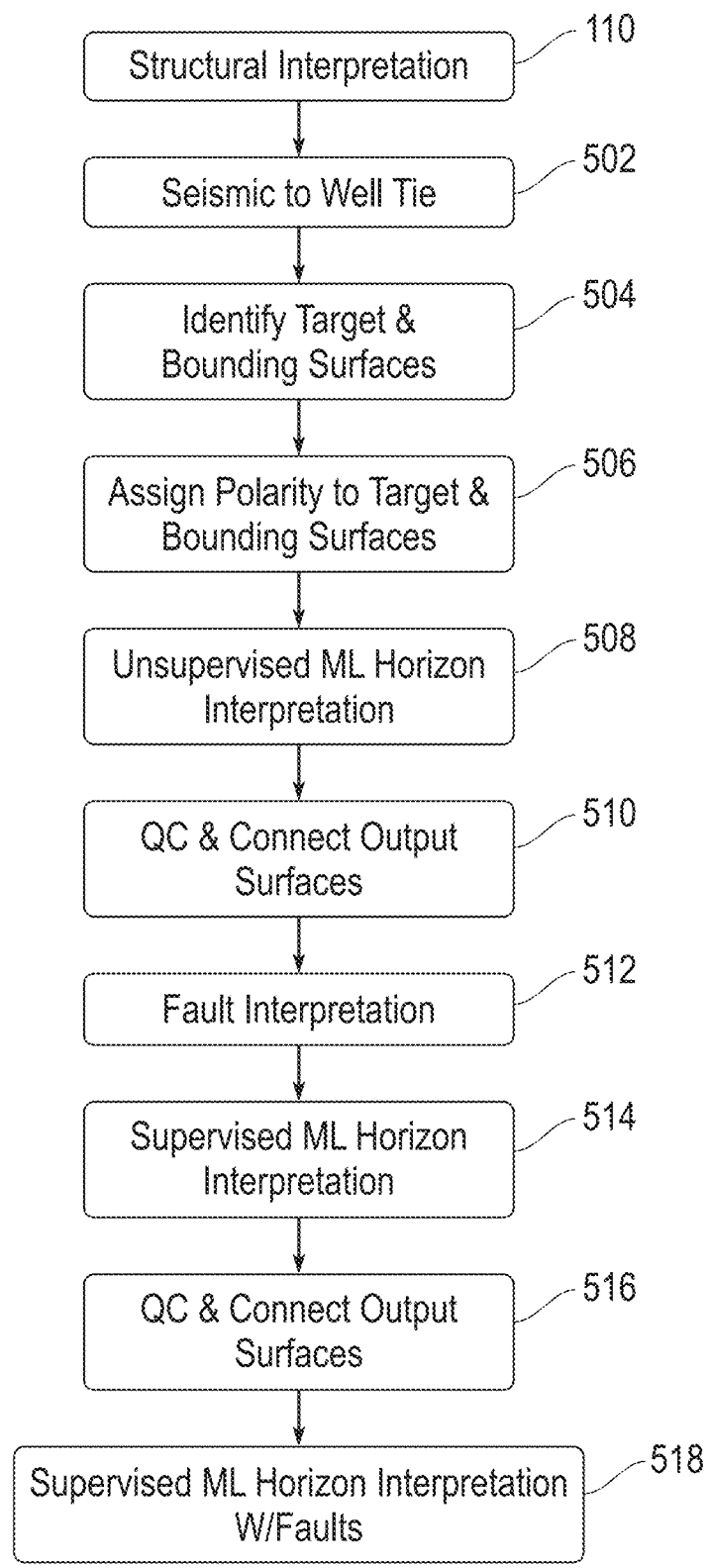
FIG. 5A is a flow diagram illustrating an example routine that includes steps associated with structural interpretation, in accordance with one or more embodiments of the present disclosure.

Referring now to FIG. 5A, a flow diagram is shown illustrating an example routine that includes steps associated with structural interpretation 110. The process associated with structural interpretation 110 can include conventional and/or machine learning methods to interpret seismic surfaces initially and, thereafter, structural elements, such as faults. In one or more implementations of the present disclosure, an initial interpretation grid can be picked manually in advance of deploying machine learning, for example, for training. Thereafter, processes can execute on one or more computing devices to provide interpretation and/or propagate structural interpretation across one or more areas of interest. Seismic surfaces that are interpreted as a function of such processes to have major fault systems define a basin structural framework. Thereafter, depositional sequences can be represented thereby identifying one or more prospective areas of stratigraphic traps. Moreover, interpreted horizons provide input for additional seismic workflows in various categories and downstream processes.

Accordingly, and with reference to the example process shown in FIG. 5A, identifying structural interpretation 110 can include steps to process and identify various categories, including seismic to wall tie 502, and target and bounding surfaces 504. Further, processes executing on one or more computing devices can assign polarity to target and bounding surfaces 506. Machine learning can operate in an unsupervised environment for horizon interpretation 508. Processing can be provided for QC and to connect output surfaces 510, including for fault interpretation 512. Thereafter, supervised machine learning horizon interpretation 514 can be provided, including for QC and connect output surfaces 516. Thereafter, supervised machine learning horizon interpretation with faults 518 can be provided for structural interpretation 110. Machine learning principles can be applied in creating a gridded model from seismic data based on the minimization of cost function. Minimum cost relates to the higher similarity leading to the automated horizon patches that are propagated throughout the seismic volume. This can be done in an unsupervised fashion using only seismic data input. However, in supervised mode, few key horizons and faults can act as a constraint to drive the model in more geologically oriented fashion. The resulting model then leads to understanding effects of sea level changes and hiatuses by converting the modeled data to wheeler domain.

Figure 5B:
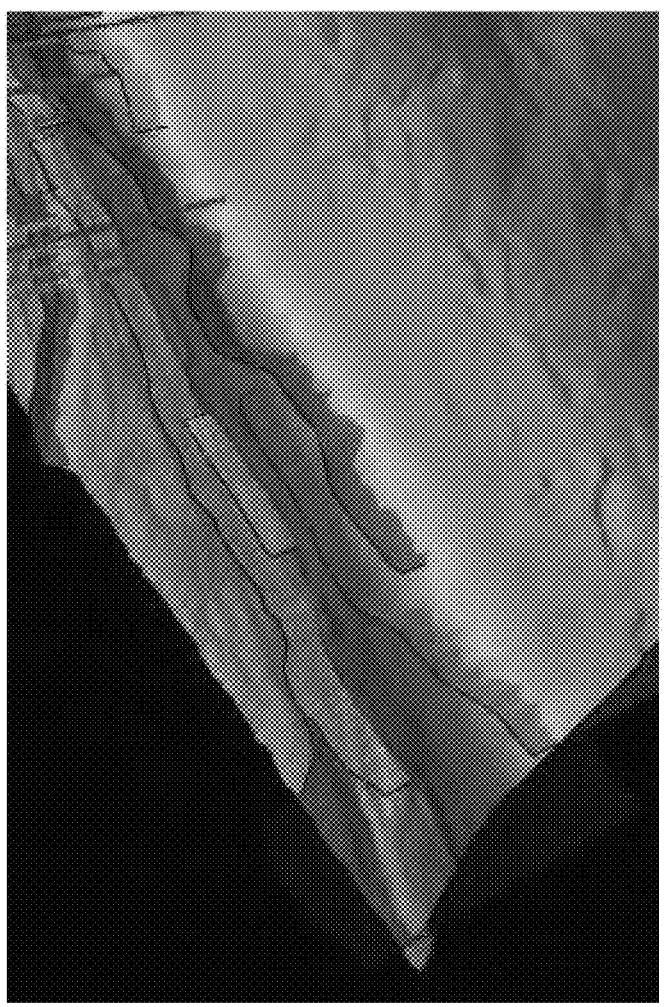
FIG. 5B illustrates horizon and fault interpretations processed in accordance with steps illustrated in FIG. 5A.

FIG. 5B illustrates horizon and fault interpretations processed in accordance with steps illustrated in FIG. 5A, which formulate the basis of structural interpretation 110.

Figure 6A:
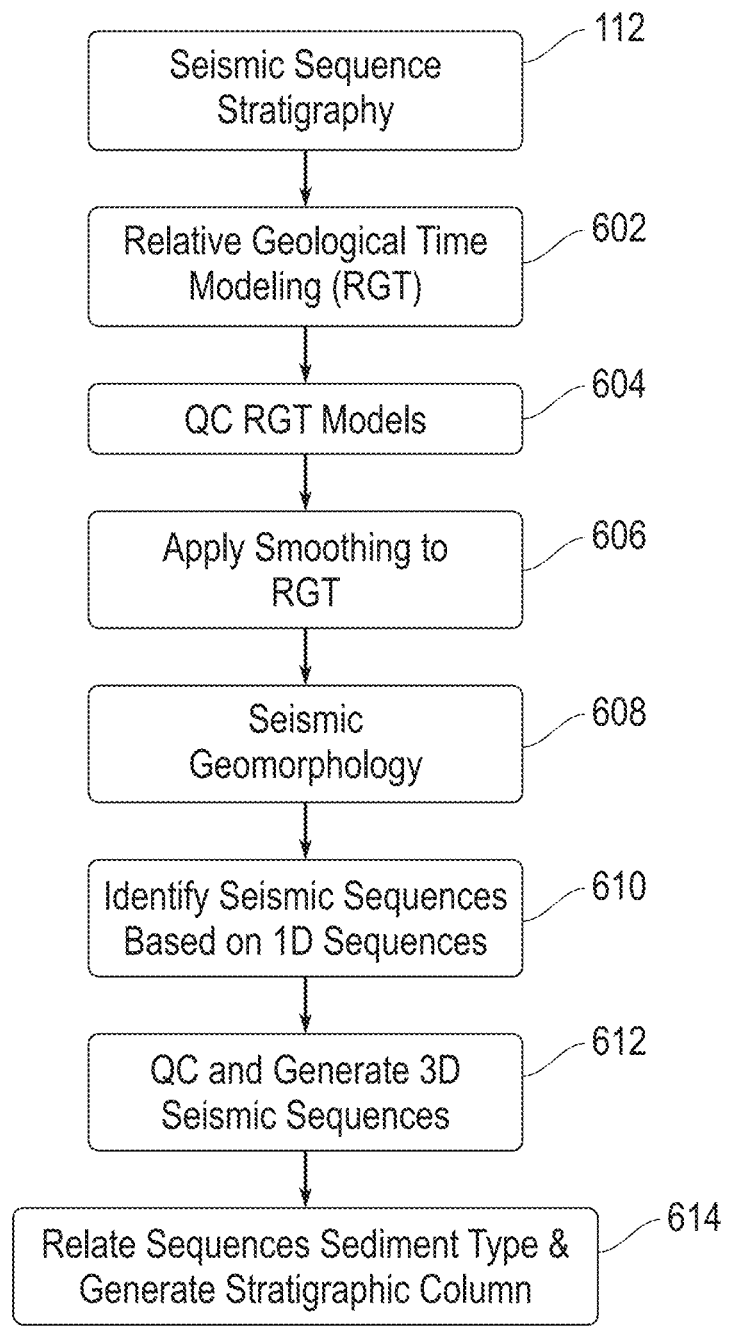
FIG. 6A is a flow diagram illustrating an example routine that includes steps associated with determining and identifying seismic sequence stratigraphy, in accordance with one or more embodiments of the present disclosure.

Referring now to FIG. 6A, a flow diagram is shown illustrating an example routine that includes steps associated with determining and identifying seismic sequence stratigraphy 112. The steps associated with seismic sequence stratigraphy 112 include correlating sedimentary layers at one or more respective depths with seismic reflections, which are produced by acoustic waves propagating through different surfaces and unconformities. Seismic reflections are part of the conditioned data. This provides information regarding the subsurface, chronostratigraphically, which is useful for predicting rock composition at a given depth from seismic data away from well controls. Another benefit includes identifying stratigraphic traps or areas of interest where rock layers potentially hold hydrocarbons. Seismic sequence models can be used to transform seismic data into a relative geological time model that depicts time and order when different layers were deposited. This further helps to define system tracts or discrete depositional units that differ from each other and that can have a distinct seismic character. These system tracts are then interpreted in the basin petroleum system framework to identify areas of potential hydrocarbon occurrences.

Accordingly, and with reference to the example process shown in FIG. 6A, seismic sequence stratigraphy 112 can include steps for relative geologic time modeling ("RGT") 602 and QC RGT modeling 604. Thereafter, smoothing can be applied to RGT 606, and seismic geomorphology is ascertained in step 608. Moreover, seismic sequences based on 1D sequences can be identified (step 610). QC and 3D seismic sequences are generated in step 612, and to relate sequences sediment type and generate a stratigraphic column in step 614. The relative geological time model 602 represents connected nodes through the seismic volume, leading to horizon patches based on the connectivity rules set forth by the interpreter. This leads to a well-connected model comprising of component horizons. This 3D model can then be used to interpret system tracts and sequence boundaries. Sediments types are assigned to each sequence and a dynamic stratigraphic column is automatically generated in the process.

Figure 6B:
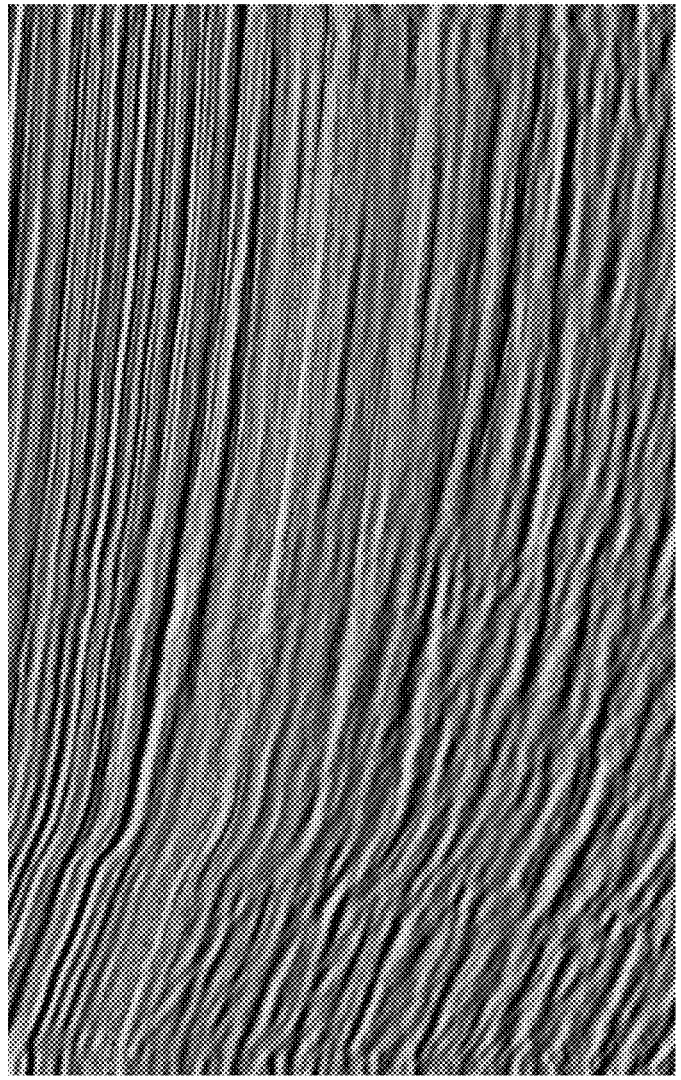
FIG. 6B illustrates an interpreted dense set of semi-automated horizons that form the basis of interpreting system tracts, in accordance with one or more embodiments of the present disclosure.
Figure 6C:
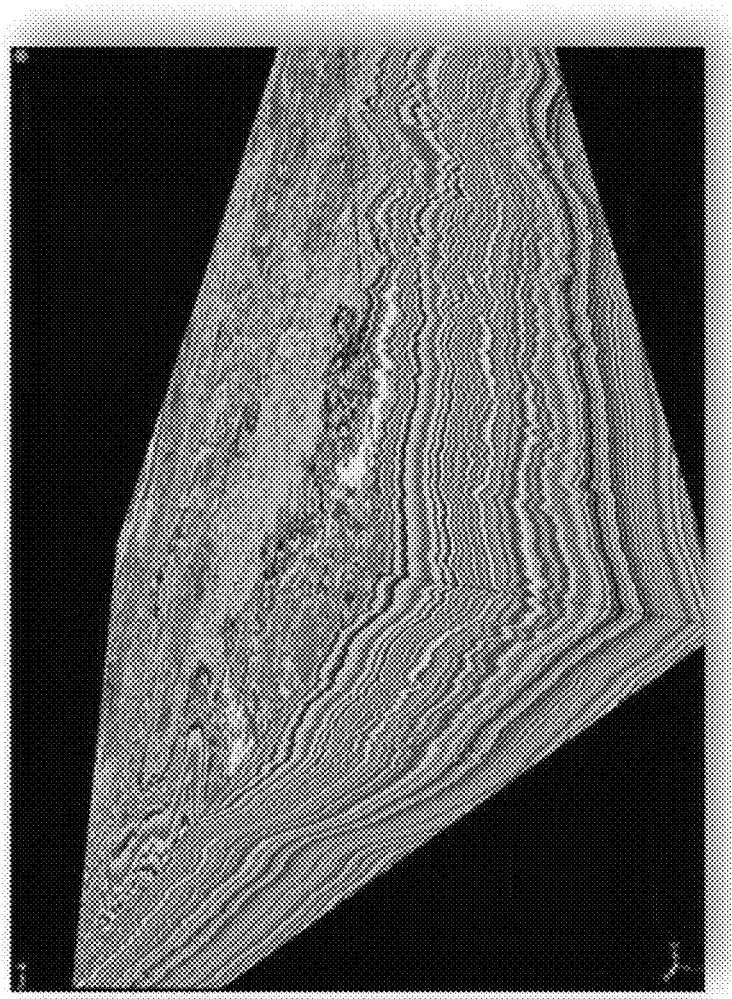
FIG. 6C illustrates results from a relative geological time model for a respective area of interest.

FIG. 6B illustrates an interpreted dense set of semi-automated horizons that form the basis of interpreting system tracts. The dense set of interpreted horizons can be generated by first sampling the seismic information at regular intervals and then applying machine learning principles, such as cost function minimization, to connect sampled points. This results in a dense set of gridding horizons, which is part of a model. Each horizon in the model is tied to the others and cannot simply be edited independently without affecting other horizons in the model. This gridded model is then converted to a 3D geological model by propagating all the horizons throughout the seismic cube. All horizons, regardless of their mode i.e., an erosionally truncated horizon, a downlapping, or an onlapping horizon, or the like, are all are present everywhere in the model while keeping the geological integrity. The geological consistency is achieved by for example for an erosional truncation by having its surface following the upper surface beyond the pinch out points. FIG. 6C illustrates results from a relative geological time model for a respective area of interest.

Figure 7A:
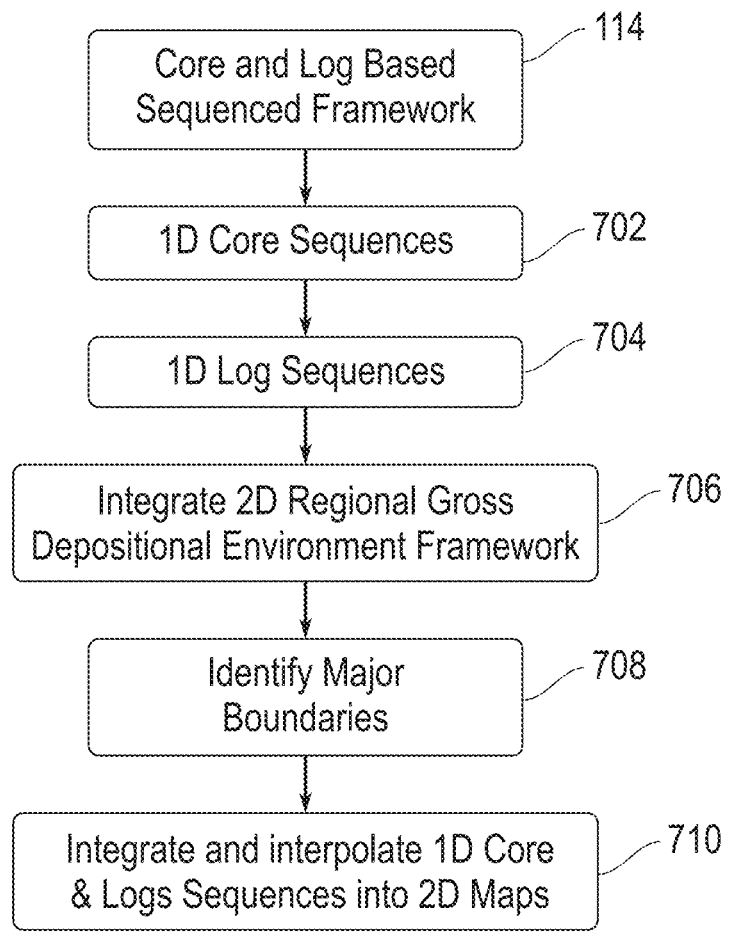
FIG. 7A is a flow diagram illustrating an example routine that includes steps associated with providing a core and log-based framework, in accordance with one or more embodiments of the present disclosure.

Referring now to FIG. 7A, a flow diagram is shown illustrating an example routine that includes steps associated with providing a core and log-based framework 114. The steps associated with providing a core and log-based framework 114 can begin with core descriptions, in which subsurface rocks are defined in detail to represent reservoir properties, such as porosity, mineral constituents, and even present fluid for some cases. Cores from different wells can be correlated to formulate how specific rock units are deposited between and away from one or more cored wells. As used herein, the term cored wells refers, generally, to wells from which cores are received to examine rock units. Generally, there is a lower percentage of cored wells in a full field with several wells. The information and description from cored wells can be correlated with information and descriptions of uncored wells to build a geological model. This leads to an identification of depositional environments for each rock unit and is a key input for seismic sequence stratigraphy. The core information can then be tied to wireline log data and propagated across all non-cored wells to create 2D models. The layer models can be integrated further with regional gross depositional maps and major sequences are identified that can hold potential stratigraphic traps.

Accordingly, and with reference to the example process shown in FIG. 7A, providing a core and log-based sequence framework 114 can include steps for processing 1D core sequences 702 and 1D logs sequences 704. Further, the process includes integrating a 2D regional gross depositional environment framework (step 706). Thereafter, major boundaries are identified (step 708) and 1D core and logs sequences are integrated and interpolated into one or more 2D maps (step 710). Step 702 involves lithological depositional sequences defined by observing the core slabs. The analyses and descriptions show how the rock was deposited in geological time and is high-resolution and captures the minute changes over geological time. A similar analysis can be conducted on wireline data in step 704, and the findings from core analysis are correlated to identify sequences that provide a particular kind of wireline log response. Correlated information regarding cored wells can be related to uncored wells, and a 2D framework established, which generally covers a greater distance to understand the regional depositional environment in step 706. In step 708 major depositional sequences are identified in 2D sections and then 2D maps are generated by interpolation in step 710.

Figure 7B:
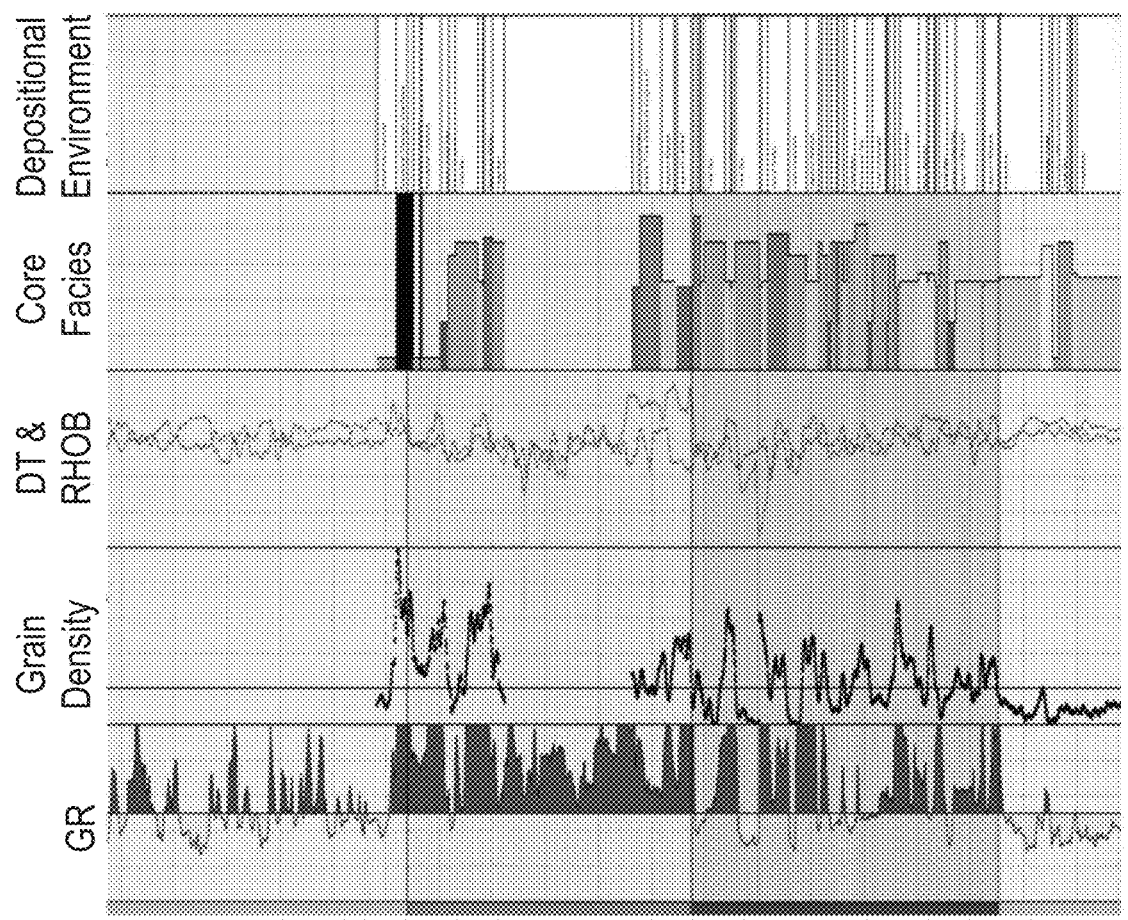
FIG. 7B illustrates an integration of well logs data with core facies translated to depositional environments, in accordance with an example implementation of the present disclosure.

FIG. 7B illustrates the integration of well logs with core facies translated to depositional environments, which provides an integral step for regional studies. FIG. 7B illustrates a well panel with basic wireline logs, grain density information from core plugs, core facies interpreted and analyzed from core slabs, and the relevant depositional environment for each of the core facies. For a given core facies, the depositional environment and how the values in key logs, such as compressional velocity, bulk density, gamma ray changes, are provided. This information can then be correlated with uncored wells and interpolated across several wells to develop a regional map and/or understandings.

Figure 8A:
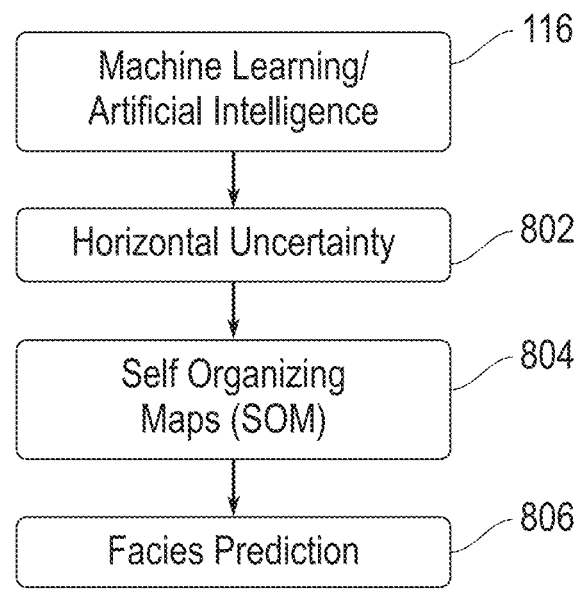
FIG. 8A is a flow diagram illustrating an example routine that includes steps associated with machine learning and artificial intelligence, in accordance with one or more embodiments of the present disclosure.

Referring now to FIG. 8A, a flow diagram is shown illustrating an example routine that includes steps associated with machine learning and artificial intelligence 116. The steps associated with process 116 include applying machine learning principles to automate the horizon interpretation throughout the seismic volume using cost function minimization methodology. This results in generating a relative geological time model that is usable to interpret sequences and manage truncations. Geological constraints, such as faults and horizons, can be used for producing accurate time seismic models. Moreover, machine learning techniques can be applied to create facies classes automatically using self-organizing maps ("SOM"). In one or more implementations, a user of a computing device controls the number of facies classes to be discovered in multi-attributes space. An iterative process using k-means clustering can then classify the data into sub-classes.

Accordingly, and with reference to the example process shown in FIG. 8A, machine learning and artificial intelligence 116 can include steps for automating horizon interpretation, including accounting for horizon uncertainty (step 802). Further self-organizing maps ("SOM") can be generated (step 804), which are usable for facies predictions (step 806). More particularly, with regard to step 802, horizon uncertainty is quantified, which affects the shape, volume and architect of a respective feature of interest. The uncertainty can be either quantified by the methodology of picking an amplitude event, such as a tracking peak or trough or zero crossing, or by using probabilistic approaches to quantify the flexure of the horizons from a given point of reference. Further, user-defined parameters can be used to determine that the horizon patches are linked to other patches, in case the correlation threshold is met (step 804). Generating SOM (Step 804) can occur via unsupervised machine learning and can create an interpretable lower dimensional representation from higher dimensional data. In this workflow, SOM is used to find the underlying patterns by using up to 3 different attributes and classify them according to their similarity thus leading to discrete seismic facies classification (step 806).

Figure 8B:
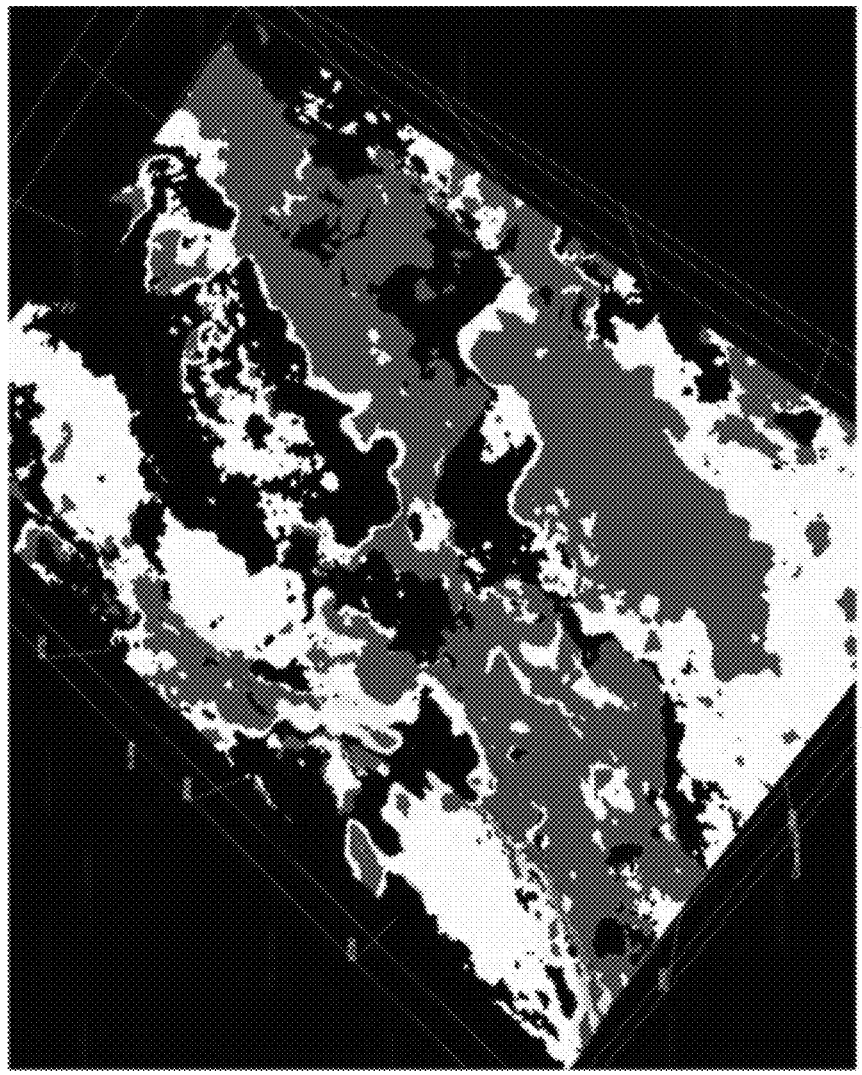
FIG. 8B illustrates results of machine learned seismic facies analysis and depicts two major seismic facies.

FIG. 8B illustrates results of machine learned seismic facies analysis, and depicts two major seismic facies. Seismic facies classification has two popular methods in geophysics. One is wavelet segmentation based, which classifies wavelets of similar response and the other is multi-attribute-based classification. This image depicts the first methodology where wavelets are used in a process called unsupervised vector quantizer. This process helps to segment the wavelets of similar characteristics based on a user-defined number of classes along a horizon. The input can be a 3D seismic volume and an interpreted horizon, and the output is a map of facies classification based on wavelets.

Figure 9A:
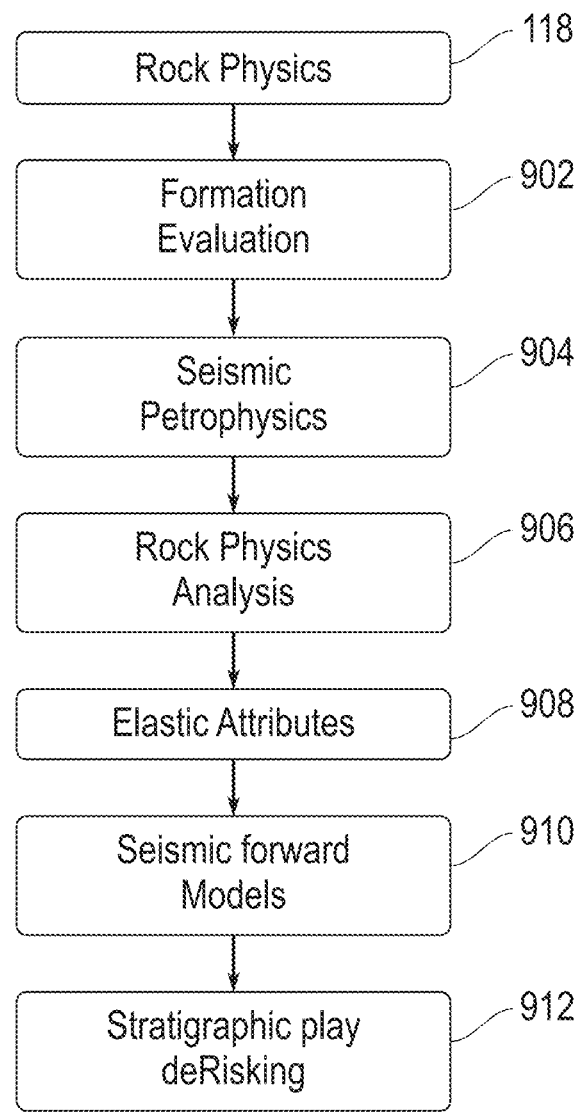
FIG. 9A is a flow diagram illustrating an example routine that includes steps associated with an application of rock physics, in accordance with one or more embodiments of the present disclosure.

Referring now to FIG. 9A, a flow diagram is shown illustrating an example routine that includes steps associated with an application of rock physics 118. The steps associated with process 118 include applying rock physics to link reservoir properties, such as porosity, saturation, mineral constituents, or the like, to the elastic properties, such as the acoustic impedance, velocity ratio, and Poisson ratio, which can be derived from seismic amplitude data. Such linkage supports a prospect generator to visualize and interpret seismic data in a form of reservoir properties, as opposed to amplitude characters. Seismic amplitudes can be transformed to rock properties through the process of seismic inversion. Each amplitude character can be understood directly as a rock type with possible fluid types. This removes the guesswork from the prospect generator interpretation, as data are interpreted as rock properties. In addition, and apart from merely linking geology to geophysics, rock physics is particularly useful in in amplitude uncertainty analysis to decode the wave response through rock layers and differentiate real rock response from fake response generated by several conditions related to seismic imaging techniques. In particular, rock physics analysis utilizes data in petrophysical logs resultant of formation evaluation, which is properly conditioned for seismic workflows by seismic petrophysical workflows. Elastic attributes generated as a function of rock physics support building seismic forward models across areas or features of interest, which can include potential stratigraphic plays. Various parameters from domains, including geological such as the rock matrix, porosity, rock types and geophysical, such as the signal to noise ratio, frequency, and wavelets, can be modeled to match an actual seismic amplitude response and to build various scenarios representing one or more features of interest. Inclusion of rock physics is unique in which several forward models are formulated to represent a stratigraphic feature of interest and mitigate risk of misrepresenting its hydrocarbon potential.

Accordingly, and with reference to the example process shown in FIG. 9A, an application of rock physics 118 can include steps formation evaluation 902, seismic petrophysics 904, and rock physics analysis 906. Moreover, elastic attributes can be generated in step 908, as well as seismic forward models 910 to support stratigraphic play de-risking (step 912). Step 902 refers to computing rock properties as porosity, saturation and mineral volumes from wireline data and is known as formation evaluation. Step 904 is described and corresponds to steps 304-308. Step 906 refers to deriving a relationship between rock porosity, saturation and mineral volumes with elastic logs, such as acoustic impedance and velocity ratio. This step helps to identify the most appropriate elastic attribute to infer one or more respective rock properties (step 908). Further, seismic forward models can be 2D synthetic sections, which are populated with properties from well logs. Thereafter, different scenarios are built with varying rock layer thicknesses, or changes in rock porosity, saturations and even rock types. These changes produce different amplitude responses, which can be compared with actual recorded seismic data to infer a respective feature of interest and reduces uncertainty.

Figure 9B:
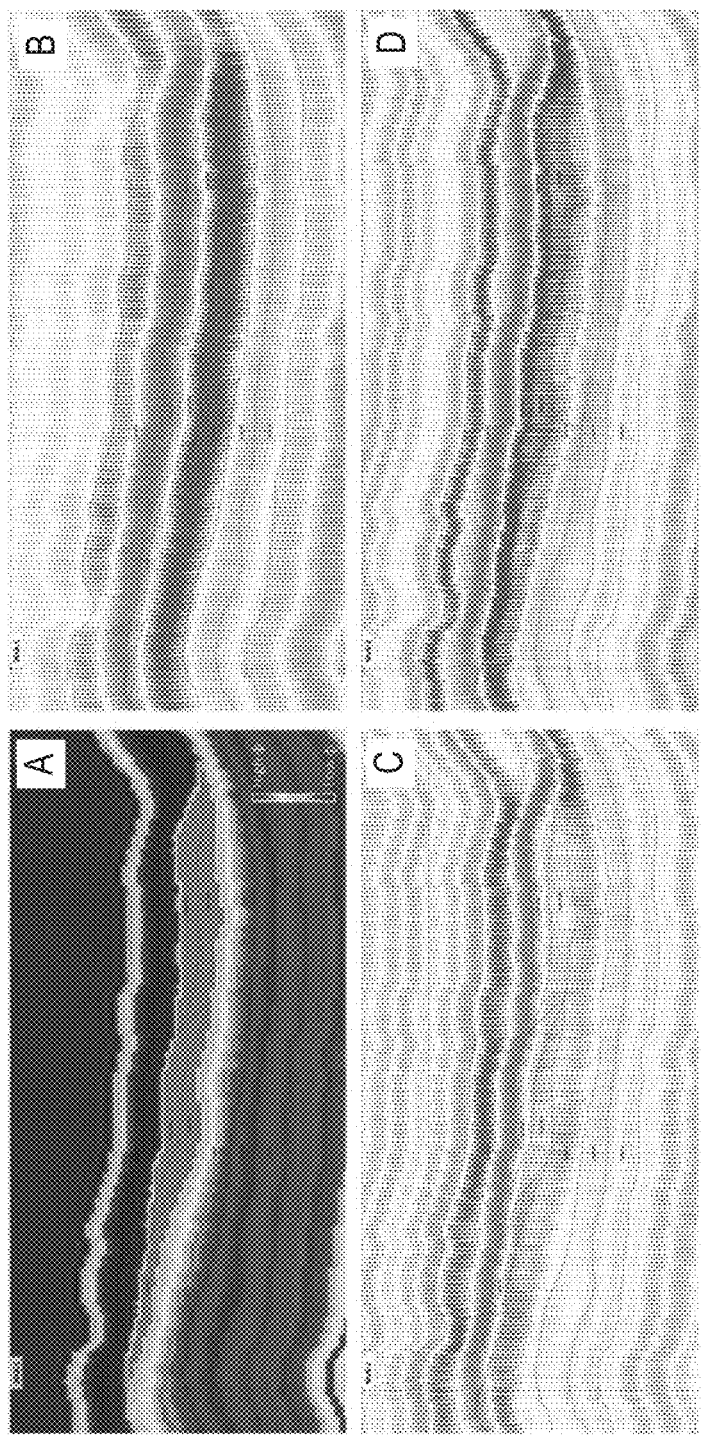
FIG. 9B illustrates seismic forward modeling based on rock physics, with porosity fill in a respective stratigraphic trap of interest.

FIG. 9B illustrates seismic forward modeling based on rock physics, with porosity fill in a respective stratigraphic trap of interest. To be able to resolve the stratigraphic package, different frequencies, wavelets (shown in portions B, C, and D) are utilized for modeling the amplitude response for comparison with actual seismic data. FIG. 9B shows, in the top left blue figures, the 2D seismic forward model which is populated with expected rock porosities. Red represents high porosity in a feature of interest, while blue represents low porosity or tight rocks. A synthetic seismic section is generated for this 2D model in section B, using a 10 Hz ricker wavelet, which is unable to resolve the feature of interest, i.e., the red high porous rock layers. Going to 20 Hz Ricker wavelet, as shown in section C, improves resolution and shows that frequency can be modeled for any given geological scenario to yield the seismic amplitude response and help the prospect generator to understand his feature of interest.

Figure 10A:
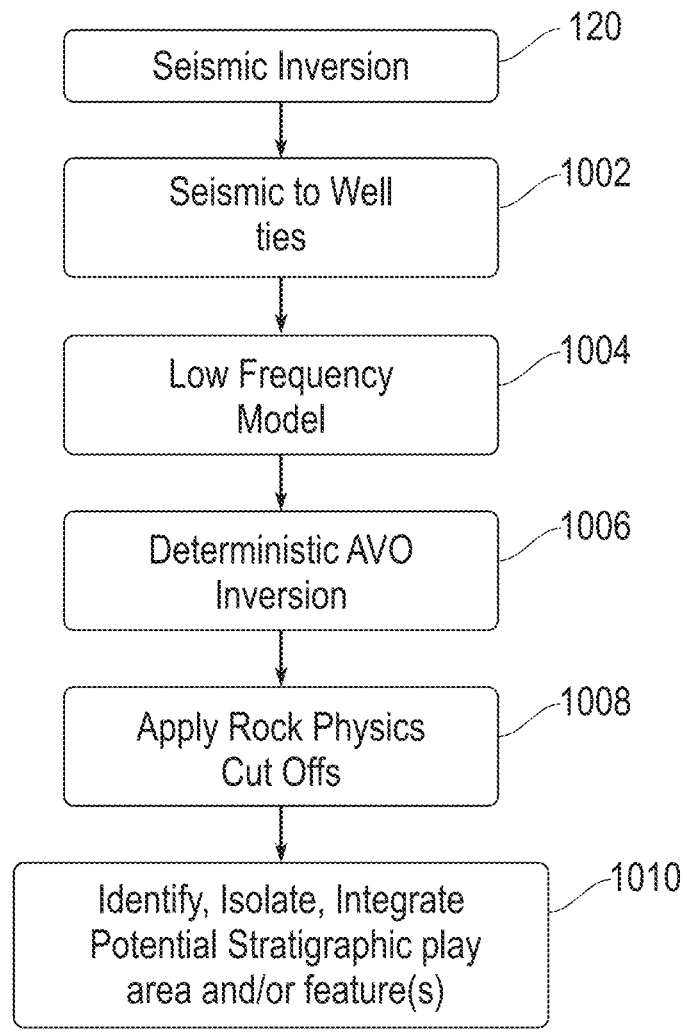
FIG. 10A is a flow diagram illustrating an example routine that includes steps associated with seismic inversion, in accordance with one or more embodiments of the present disclosure.

Referring now to FIG. 10A, a flow diagram is shown illustrating an example routine that includes steps associated with seismic inversion 120. The steps associated with process 120 include transforming the seismic amplitude data into rock properties with integrations of data from well logs and cores. Seismic inversion can be post-stack or pre-stack, and usable to yield elastic attributes, such as acoustic impedance and velocity ratio, which are helpful to represent porosity, rock types, and even fluid fill for subsurface rock layers.

In one or more implementations of the present disclosure, data from well logs are tied to seismic data for interpreting key layers. Moreover, velocity-density information is propagated across wells to formulate a low-frequency model ("LFM"). Further, seismic horizons are usable to develop a layer bound LFM. Instead of using only few seismic horizons encapsulating big subsurface intervals, however, it is preferred to add a plurality of layers that describe a subsurface geology and differentiate between rock layers. In the workflow shown in FIG. 10A, a seismic inversion step can be performed twice. An initial pass is carried with key seismic horizons that are tied to wells. Thereafter, a second pass is carried out with inclusion of detailed horizons and/or geological features based on a seismic sequence stratigraphy step. This unique addition improves defining a stratigraphic play and representing the reservoir properties within a respective feature of interest. Once the seismic inversion attributes are obtained, a stratigraphic feature of interest is populated with the attributes.

Accordingly, and with reference to the example process shown in FIG. 10A, a plurality ties of seismic horizon information to wells are made (step 1002). At step 1004, a low-frequency model is generated and a deterministic AVO inversion is made at step 1006. At step 1008, rock physics cutoffs are applied and the process ends at step 1010 when potential stratigraphic play area or features are identified, isolated, and integrated. The process transforms seismic reflection data into a quantitative rock-property description of a reservoir. More particularly, corrected well logs are tied to seismic in time domain and ensured that geological marks correspond well to known representative seismic amplitude character (step 1002). Using the seismic horizons as guide, a time domain geological 3D model or framework is created, which is filled (e.g., interpolated) with the wells penetrating the 3D model (step 1004). Generally, these are bulk density, compressional and shear velocity logs interpolated across the 3D model. Thereafter, the transformation process is carried out in which seismic amplitude data is converted to rock properties in that 3D framework (step 1006). These are most commonly acoustic impedance (bulk density x compressional velocity product) or velocity ratio (compressional velocity/shear velocity product). These are 3D products covering the extent of seismic data. Using the knowledge gained from Step-906, specific mathematical models or cut offs are applied to the 3D seismic inversion data to obtain 3D rock properties such as porosity, fluid type and rock type. Converting the seismic data now to 3D reservoir properties help the prospect generator to focus and isolate the area or features of interest.

Figure 10B:
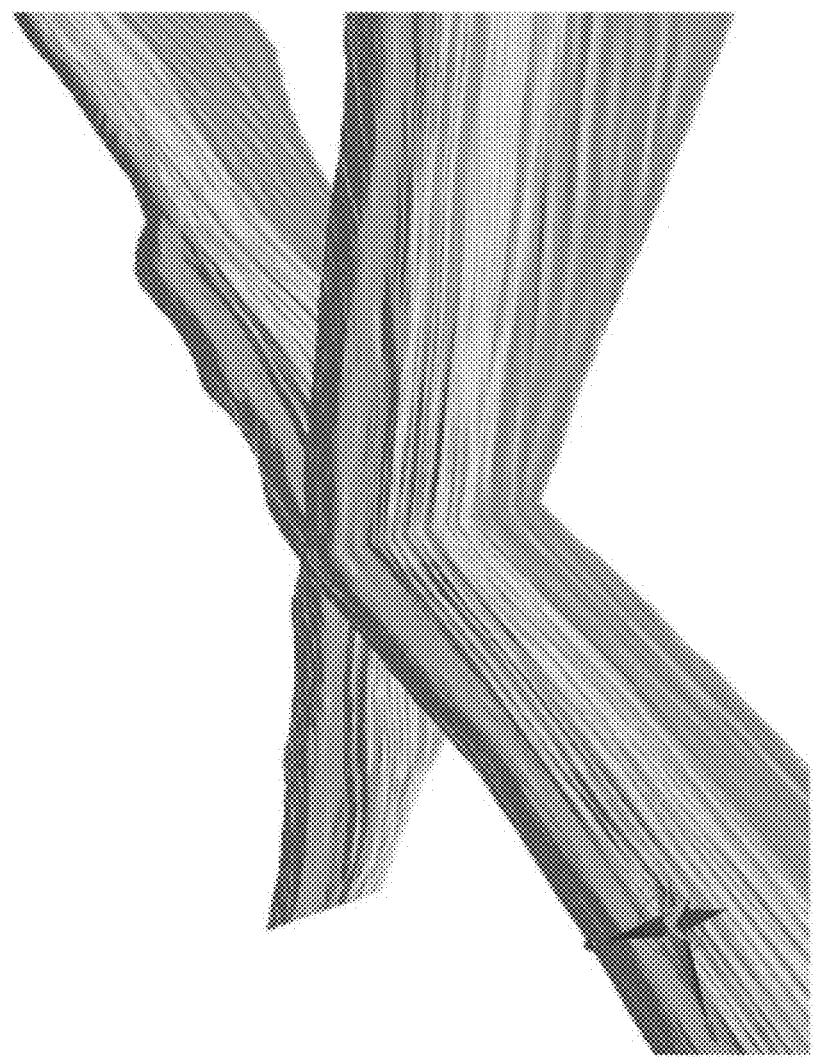
FIG. 10B illustrates an example seismic inversion acoustic impedance section across a respective area of interest.

FIG. 10B illustrates an example seismic inversion acoustic impedance section across a respective area of interest. In the example shown in FIG. 10B, an acoustic impedance rock property helps to identify different rock types. Green represents a high acoustic impedance referring to tight or stiff rock types such as carbonates, while the red represents low acoustic impedance, referring to porous or soft rocks such as clastic rocks.

Figure 11A:
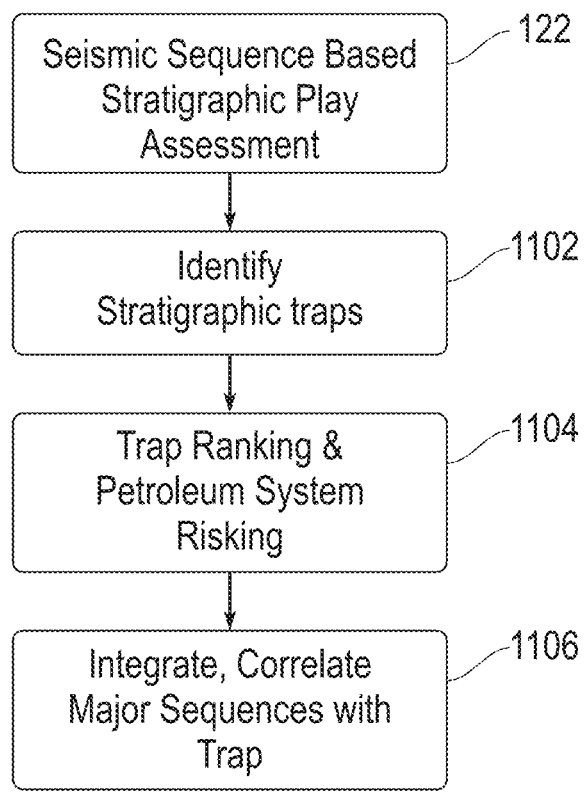
FIG. 11A is a flow diagram illustrating an example routine that includes steps associated with seismic sequence-based stratigraphic play assessment, in accordance with one or more embodiments of the present disclosure.

Referring now to FIG. 11A, a flow diagram is shown illustrating an example routine that includes steps associated with seismic sequence-based stratigraphic play assessment 122. The steps associated with process 122 include steps that follow combining seismic stratigraphy sequences and rock physics models with seismic inversion, and deriving various seismic attributes. Integrating information associated with such seismic attributes, for example, with regional understanding of a respective area of interest, new insights into potential areas of stratigraphic traps are made available. Depending upon the basinal play, e.g., clastic or carbonate settings, several stratigraphic features of interest are provided that would either not be available or require significant investment of time, including to carefully rank to a shortlist for further evaluation. In one or more implementations, ranking can be done in conjunction with a basinal petroleum system to understand respective components, including trap mechanism, source rock, reservoir rock and the sealing layer forming the stratigraphic trap. Without the benefits of the teachings herein, this step can be iterative and exhaustive, for example, depending upon a particular stratigraphic feature of interest mapped in the basin. Moreover, numerous channels could be present initially need to be mapped in order for understanding of paleography and, ultimately, hydrocarbon potential.

Accordingly, and with reference to the example process shown in FIG. 11A, an application of seismic sequence based stratigraphic play assessment 122 is shown. Assessment 122 can include steps including identifying stratigraphic traps (step 1102), trap ranking and petroleum system risking (step 1104), and integrating and correlating major sequences with a stratigraphic trap (step 1106). With reference to step 1102, seismic data are analyzed and interpreted to isolate the stratigraphic features of interest. These features will be dependent upon the depositional environments. Each of the identified stratigraphic traps is then analyzed to understand the potential to have reservoir rocks bearing hydrocarbon fluids. Once ranking is complete, each trap can be correlated with sequence knowledge gained from steps 112, 114 and 118 (FIG. 1), which reduces uncertainty in proposing drilling the traps.

Figure 11B:
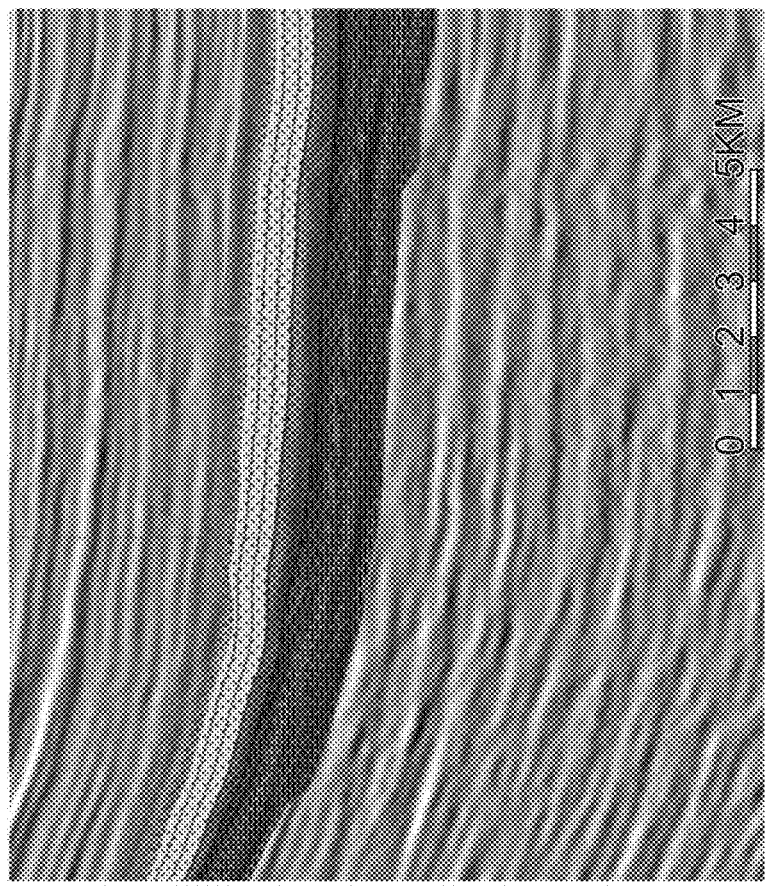
FIG. 11B illustrates an example seismic sequence based stratigraphic play assessment.

FIG. 11B illustrates a seismic section with an interpreted stratigraphic trap of interest, penetrated by two wells. The trap boundaries are well-defined using the seismic sequence understanding it is filled with different rock types as inferred from the penetrated wells and or expected depositional environments. This configuration helps in understanding the extend or geometry of the stratigraphic trap, and also de-risks the future location targeting only the reservoir rocks.

Figure 12A:
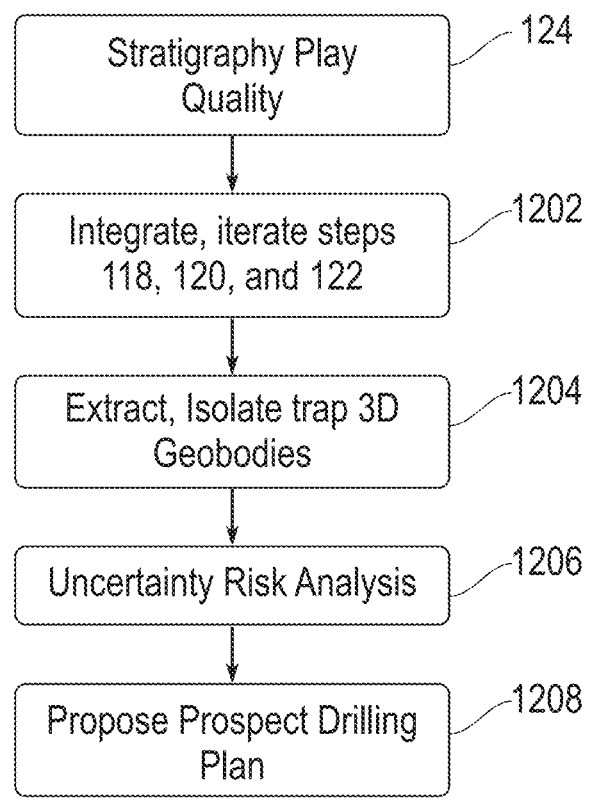
FIG. 12A is a flow diagram illustrating an example routine that includes steps associated with stratigraphic play quality, in accordance with one or more embodiments of the present disclosure.

Referring now to FIG. 12A, a flow diagram is shown illustrating an example routine that includes steps associated with stratigraphic play quality 124. The steps associated with process 124 not only identify stratigraphic traps, but also include processes to evaluate traps on the basis of their hydrocarbon potential. Moreover, risk mitigation can be performed to prevent drilling a dry well. Several stratigraphic features of interest can be mapped in the basin. If any component of a petroleum system appears to be lacking, one or more categories (e.g., rock physics 118, seismic inversion 120, and seismic sequence based stratigraphic play assessment 122) may have to be repeated to fine tune regional interpretation and/or target other areas of interest. In one or more implementations, uncertainty risk analysis can be performed for the top several (e.g., 3 to 5) stratigraphic features of interest, and scoring can be provided to represent respective degrees of risk. Based on risk analysis scores, a well location can be proposed for the top stratigraphic play. Risk analysis scores can be generated from the results from various processes, starting from basic fulfillment of petroleum systems (e.g., trap and seal) and reservoir rock entrapping the stratigraphic feature of interest. Thereafter, additional information directly from seismic attributes and machine learned seismic facies can be used to further add a score of potentially finding the hydrocarbons in the feature of interest. Final scores can be added from rock physics and seismic inversion steps that helps in mapping the reservoir properties directly and spatially. Generally, a high score represents a trap that is ideal for further analysis for proposal of drilling a well.

Accordingly, and with reference to the example process shown in FIG. 12A, an application of stratigraphic play quality assessment 124 is shown. Assessment 124 can include steps including integrating and iterating rock physics 118, seismic inversion 120, and seismic sequence based stratigraphic play assessment 122, as shown and described herein. Further, at step 1204, one or more instructions are executed to extract and isolate trap 3D geobodies. Furthermore, uncertainty risk analysis 1206 can be provided and used to represent (e.g., propose) a prospective drilling plan (step 1208). Stratigraphic play quality, the results from seismic sequence based stratigraphic play assessment (step 122) as well as from Seismic Inversion (step 120) and rock physics (step 118) can be analyzed, which help identify and rank the top stratigraphic features of interest. The final rank bodies are then fully mapped in 3D spatial using a specialized 3D visualization platform in step 1204, which can be used to calculate the area, the thickness and the gross volume of the stratigraphic trap. Step 1204 can also include extracting the feature of interest as a 3D body, e.g., a geobody, to aid in swift visual interpretation. In a petroleum system basin, there could be several stratigraphic features of interest, which can be ranked. Thereafter, uncertainty risk analysis is carried out in step 1206 to further pick the top scoring traps. Uncertainty risk analysis could be statistical based as well as incorporation of the assessment score card from a previous step, such as step 122. Further, step 1208 includes proposed well planning and drill scheduling to target the hydrocarbon bearing zones.

Figure 12B:
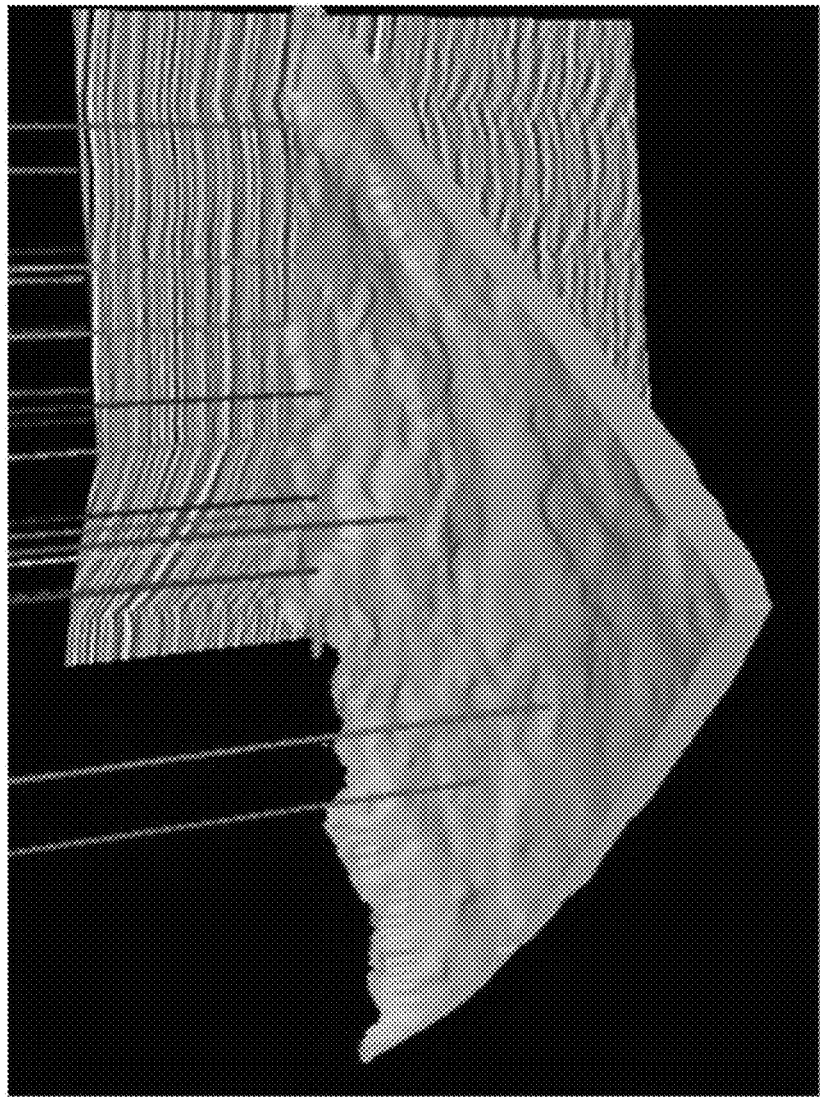
FIG. 12B illustrates an example geobody of stratigraphic play extracted after sequence-based assessment with a potential of bearing hydrocarbon.
Figure 12C:
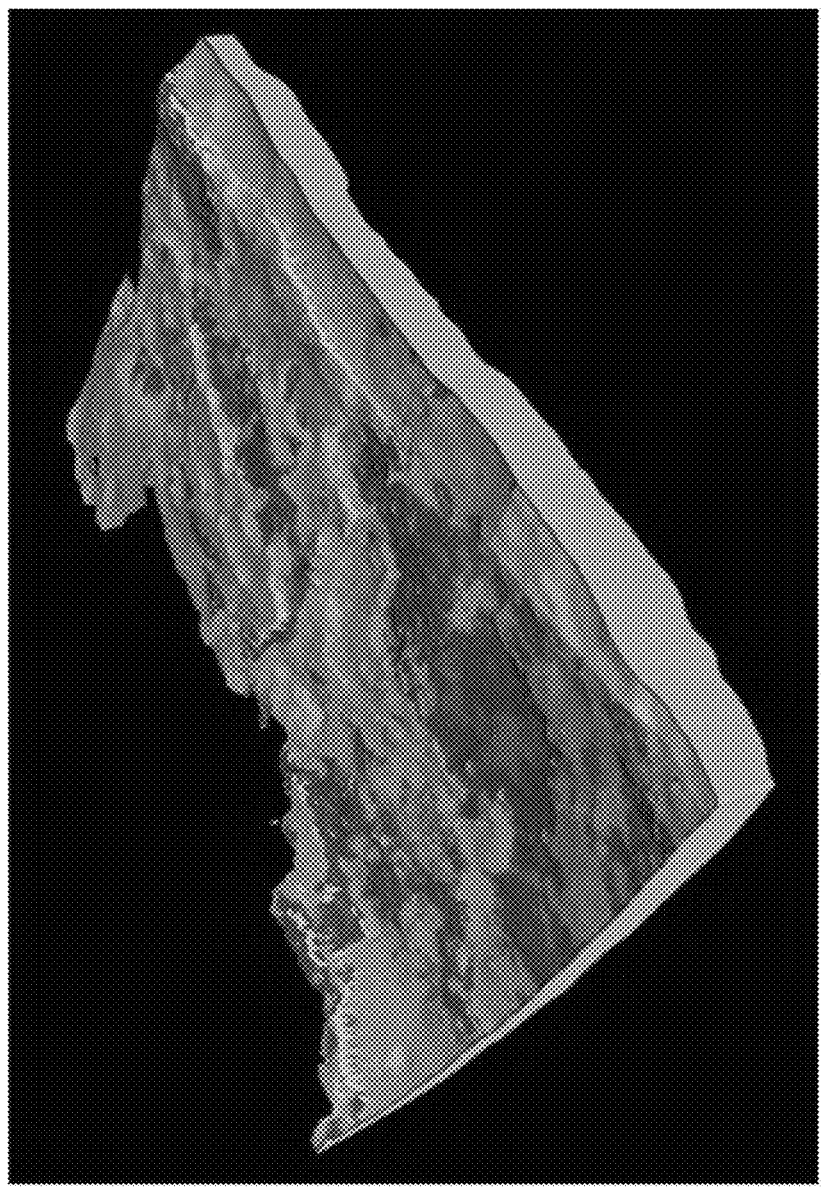
FIG. 12C illustrates a selected stratigraphic play that has been blended with seismic derived reservoir properties to highlight areas for drilling wells.

FIG. 12B illustrates an example geobody of stratigraphic play extracted after sequence-based assessment with a potential of bearing hydrocarbon. FIG. 12C illustrates a selected stratigraphic play that has been blended with seismic derived reservoir properties to highlight areas (e.g., the "sweet spots") ideal for drilling wells.

Thus, as shown and described herein, the present disclosure provides for integrated systems and methods for maximizing information extraction from seismic amplitude data in connection with data technologies. processes are dependent on multitudes of datasets, including from 1D core data to 3D seismic data. The present disclosure further provides for improvements in seismic data quality, which reduces uncertainty and false interpretations.

In addition to a reliance on seismic sequence stratigraphy and seismic attribute analysis, the present disclosure ensures improved seismic data quality with the use of advanced imaging techniques and by validating log data quality. Moreover, comprehensive rock physics based seismic forward models can be utilized to decode one or more seismic signals, as well to model the seismic behavior of stratigraphic plays. Further, seismic AVO inversion attributes can be used to isolate areas of interest within the stratigraphic plays. Moreover, stratigraphic plays are evaluated, ranked, and risked-based on basinal petroleum system elements. In one or more implementations, machine learning interpretation techniques identify porosity areas in the play. Further, major channel systems of variable size, geometry, and fills can be yielded, including as a function ranked channels within mappings. FIG. 12C illustrates an example selected stratigraphic play that is blended with seismic derived reservoir properties to highlight the targeted areas ideal for drilling wells. Hence the present disclosure is ideal for broadband band with good quality of wireline data.

The present disclosure provides technological improvements over known systems, including by providing integration with regional basinal studies and/or regional petroleum systems, and utilizing detailed core-wireline data-based sediment correlations. Further, the present disclosure generates seismic forward models using rock physics to represent seismic characteristics across a particular stratigraphic feature of interest. Still further, machine learned seismic interpretations and attributes generate a multitude of target area identification and/or to identify stratigraphic features of interest. Moreover, pre-stack seismic inversion attributes are usable to represent the lithology and fluid fills in one or more stratigraphic feature of interest. In all, the present disclosure reduces uncertainty, and improves accuracy in analysis and ranking of stratigraphic features of interest.

Conventional seismic stratigraphic approaches to target stratigraphic traps are time-consuming and are not sufficiently robust for lacking integration of various key data types. By including machine learning, seismic interpretation has made the traditional approach very efficient, and targeted rock physics modeling and seismic inversion with seismic attributes improve targeting stratigraphic plays and ranking wells for improved locating and scheduling drilling plans.

Figure 13:
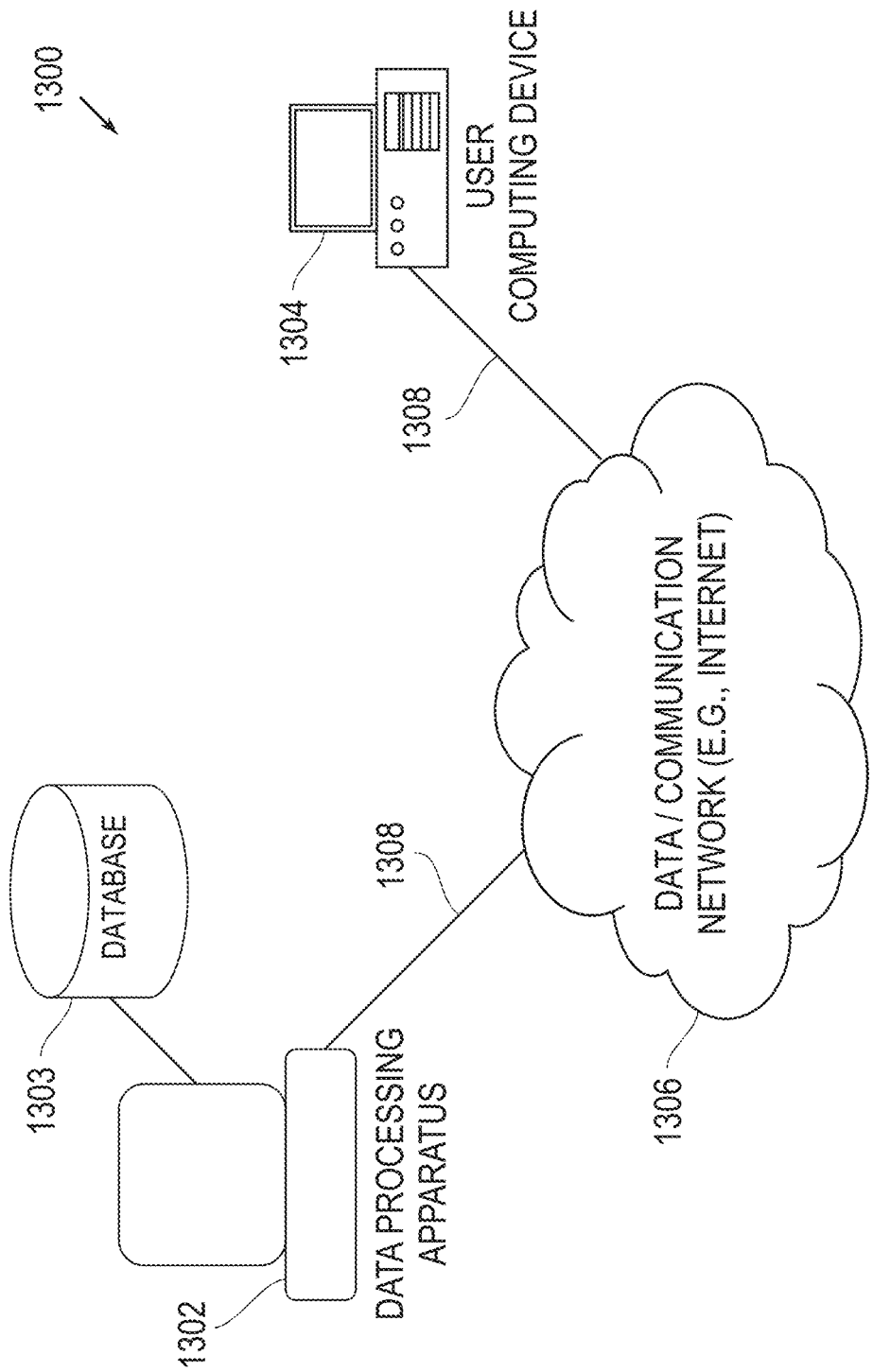
FIG. 13 is a block diagram that shows an example hardware arrangement that operates for providing the systems and methods disclosed herein.

Referring to FIG. 13, a diagram is provided that shows an example hardware arrangement that operates for providing the systems and methods disclosed herein and designated generally as system 1300. System 1300 can include one or more information processors 1302 that are at least communicatively coupled to one or more user computing devices 1304 across communication network 1306. Information processors 1302 and user computing devices 1304 can include, for example, mobile computing devices such as tablet computing devices, smartphones, personal digital assistants or the like, as well as laptop computers and/or desktop computers, server computers and mainframe computers. Further, one computing device may be configured as an information processor 1302 and a user computing device 1304, depending upon operations being executed at a particular time.

With continued reference to FIG. 13, information processor 1302 can be configured to access one or more databases 1303 for the present disclosure, including source code repositories and other information. However, it is contemplated that information processor 1302 can access any required databases via communication network 1306 or any other communication network to which information processor 1302 has access. Information processor 1302 can communicate with devices comprising databases using any known communication method, including a direct serial, parallel, universal serial bus ("USB") interface, or via a local or wide area network.

User computing devices 1304 can communicate with information processors 1302 using data connections 1308, which are respectively coupled to communication network 1306. Communication network 1306 can be any communication network, but typically is or includes the Internet or other computer network. Data connections 1308 can be any known arrangement for accessing communication network 1306, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 1304 preferably have the ability to send and receive data across communication network 1306, and are equipped with web browsers, software disclosures, or other means, to provide received data on display devices incorporated therewith. By way of example, user computing device 1304 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 1306, and that wireless communication can be provided between wireless devices and information processors 1302.

System 1300 preferably includes software that provides functionality described in greater detail herein, and preferably resides on one or more information processors 1302 and/or user computing devices 1304. One of the functions performed by information processor 1302 is that of operating as a web server and/or a web site host. Information processors 1302 typically communicate with communication network 1306 across a permanent i.e., un-switched data connection 1308. Permanent connectivity ensures that access to information processors 1302 is always available.

Figure 14:
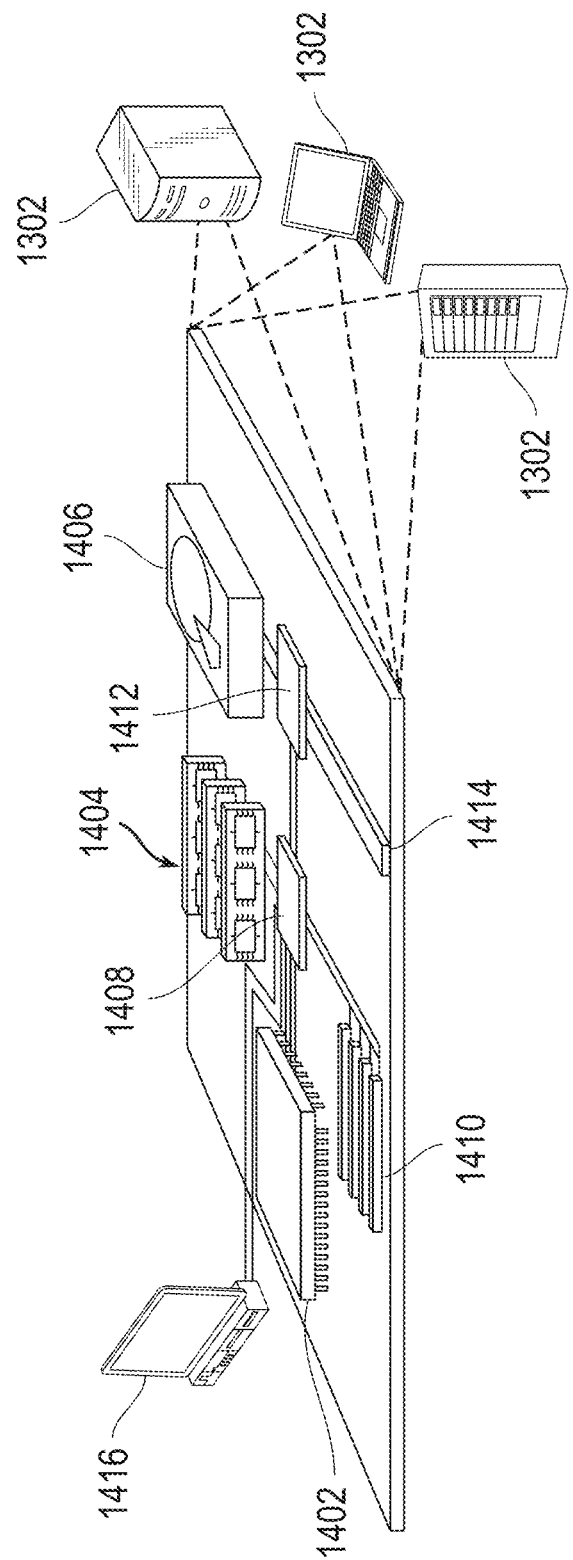
FIG. 14 shows an example of an information processor that can be used to implement the techniques described herein the present disclosure.

FIG. 14 shows an example information processor 1302 that can be used to implement the techniques described herein. The information processor 1302 is intended to represent various forms of digital computers, such as laptops, desktops, workstations, personal digital assistants, servers, blade servers, mainframes, and other appropriate computers. The components shown in FIG. 14, including connections and relationships, and their functions, are meant to be exemplary only, and are not meant to limit implementations of the inventions described and/or claimed in this document.

The information processor 1302 includes a processor 1402, a memory 1404, a storage device 1406, a high-speed interface 1408 connecting to the memory 1404 and multiple high-speed expansion ports 1410, and a low-speed interface 1412 connecting to a low-speed expansion port 1414 and the storage device 1406. Each of the processor 1402, the memory 1404, the storage device 1406, the high-speed interface 1408, the high-speed expansion ports 1410, and the low-speed interface 1412, are interconnected using various busses, and can be mounted on a common motherboard or in other manners as appropriate. The processor 1402 can process instructions for execution within the information processor 1302, including instructions stored in the memory 1404 or on the storage device 1406 to display graphical information for a GUI on an external input/output device, such as a display 1416 coupled to the high-speed interface 1408. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1404 stores information within the information processor 1302. In some implementations, the memory 1404 is a volatile memory unit or units. In some implementations, the memory 1404 is a non-volatile memory unit or units. The memory 1404 can also be another form of computer-readable medium, such as a magnetic or optical disk.

The storage device 1406 is capable of providing mass storage for the information processor 1302. In some implementations, the storage device 1406 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 1404, the storage device 1406, or memory on the processor 1402.

The high-speed interface 1408 can be configured to manage bandwidth-intensive operations, while the low-speed interface 1412 can be configured to manage lower bandwidth-intensive operations. Of course, one of ordinary skill in the art will recognize that such allocation of functions is exemplary only. In some implementations, the high-speed interface 1408 is coupled to the memory 1404, the display 1416 (e.g., through a graphics processor or accelerator), and to the high-speed expansion ports 1410, which can accept various expansion cards (not shown). In an implementation, the low-speed interface 1412 is coupled to the storage device 1406 and the low-speed expansion port 1414. The low-speed expansion port 1414, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

As noted herein, the information processor 1302 can be implemented in a number of different forms, as shown in the figure. For example, it can be implemented as a standard server, or multiple times in a group of such servers. In addition, it can be implemented in a personal computer such as a laptop computer. It can also be implemented as part of a rack server system. Alternatively, components from the computing device 200 can be combined with other components in a mobile device (not shown), such as a mobile computing device.

The terms "a," "an," and "the," as used in this disclosure, means "one or more," unless expressly specified otherwise.

The term "communicating device," as used in this disclosure, means any hardware, firmware, or software that can transmit or receive data packets, instruction signals or data signals over a communication link. The hardware, firmware, or software can include, for example, a telephone, a smart phone, a personal data assistant (PDA), a smart watch, a tablet, a computer, a software defined radio (SDR), or the like, without limitation.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, an optical communication link, or the like, without limitation. The RF communication link can include, for example, Wi-Fi, WiMAX, IEEE 802.11, DECT, 0G, 1G, 2G, 3G or 4G cellular standards, Bluetooth, or the like, without limitation.

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, or the like, without limitation.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, Wi-Fi, WiMAX, IEEE 802.11, DECT, 0G, 1G, 2G, 3G, 4G, or 5G cellular standards, Bluetooth, or the like.

The terms "transmission" and "transmit," as used in this disclosure, refer to the conveyance of signals via electricity, acoustic waves, light waves and other electromagnetic emissions, such as those generated in connection with communications in the radio frequency (RF) or infrared (IR) spectra. Transmission media for such transmissions can include coaxial cables, copper wire and fiber optics, including the wires that comprise a system bus coupled to the processor.

The term "database," as used in this disclosure, means any combination of software and/or hardware, including at least one disclosure and/or at least one computer. The database can include a structured collection of records or data organized according to a database model, such as, for example, but not limited to at least one of a relational model, a hierarchical model, a network model or the like. The database can include a database management system disclosure (DBMS) as is known in the art. The disclosure may include, but is not limited to, for example, a program that can accept connections to service requests from clients by sending back responses to the clients. The database can be configured to run the disclosure, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which can be configured to communicate data via a wireless and/or a wired communication medium. These networks can run a variety of protocols not limited to TCP/IP, IRC or HTTP.

The term "server," as used in this disclosure, means any combination of software and/or hardware, including at least one disclosure and/or at least one computer to perform services for connected clients as part of a client-server architecture. The server can include, but is not limited to, for example, a program that can accept connections to service requests from clients by sending back responses to the clients. The server can be configured to run the disclosure, often under heavy workloads, unattended, for extended periods of time with minimal human direction. The server can include a plurality of computers configured, with the disclosure being divided among the computers depending upon the workload. For example, under light loading, the disclosure can run on a single computer. However, under heavy loading, multiple computers can be required to run the disclosure. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The invention encompassed by the present disclosure has been described with reference to the accompanying drawings, which form a part hereof, and which show, by way of illustration, example implementations and/or embodiments. As such, the figures and examples above are not meant to limit the scope of the present disclosure to a single implementation, as other implementations are possible by way of interchange of some or all of the described or illustrated elements, without departing from the spirit of the present disclosure. Among other things, for example, the disclosed subject matter can be embodied as methods, devices, components, or systems.

Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

Furthermore, it is recognized that terms used herein can have nuanced meanings that are suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter can be based upon combinations of individual example embodiments, or combinations of parts of individual example embodiments.

The foregoing description of the specific implementations will so fully reveal the general nature of the disclosure that others can, by applying knowledge within the skill of the relevant art(s) (including the contents of the documents cited and incorporated by reference herein), readily modify and/or adapt for various disclosures such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown of drawings are shown accordingly to one example and other dimensions can be used without departing from the present disclosure.

While various implementations of the present disclosure have been described above, it should be understood that they have been presented by way of example, and not limitation. It would be apparent to one skilled in the relevant art(s) that various changes in form and detail could be made therein without departing from the spirit and scope of the disclosure. Thus, the present disclosure should not be limited by any of the above-described example implementations, and the invention is to be understood as being defined by the recitations in the claims which follow and structural and functional equivalents of the features and steps in those recitations.

The invention claimed is:

1. A computer-implemented stratigraphic play quality generation method, the method comprising:
   i) receiving, by at least one computing device configured by executing instructions, data including seismic data and log data, respectively received from each of a plurality of respective data sources, wherein at least some of the seismic data include stratigraphic data;
   ii) processing, by the at least one computing device using at least one of an imperial, statistical, and machine learning technique, at least some wireline data included in the log data to correct for a borehole condition associated with a geologic area, and to predict missing wireline data;
   iii) determining, by the at least one computing device using the processed wireline data, seismic attributes including structural attributes and stratigraphic attributes;
   iv) applying, by the at least one computing device, machine learning to generate a model from at least some of the received data to determine at least one seismic surface and at least one structural element;
   v) transforming, by the at least one computing device using a seismic sequence model, at least some of the received data into a relative geological time model;
   vi) determining, by the at least one computing device using the relative geological time model, attributes of at least one seismic sequence including by decomposing a signal included in the received data into component frequencies and applying an additive color model;
   vii) deriving from the seismic attributes, by the at least one computing device, a parameter respectively representing at least one of frequency, attenuation, amplitude character, and time;
   viii) linking, by the at least one computing device, reservoir properties associated with the geologic area to elastic properties associated with the geologic area;
   ix) building, by the at least one computing device, a seismic forward model having 2D synthetic sections that are populated with properties from log data, wherein the seismic forward model represents at least one stratigraphic feature of interest associated with the geologic area; and
   x) processing, by the at least one computing device, at least some of the seismic forward model to increase resolution and to generate, by the at least one computing device as a function of the increased resolution, the attributes of the at least one seismic sequence, and the derived parameter, a 3D map that is usable for a prospective drilling plan.

2. The method of claim 1, wherein the at least one computing device uses at least one of seismic sequence stratigraphy, rock physics, seismic inversion, and machine learning for:
   extracting the attributes of at least one seismic sequence;
   determining the at least one seismic surface and the at least one structural element;
   ascertaining the subsurface of the geologic area;
   linking the reservoir properties to elastic properties;
   building the 2D model; and
   generating the 3D map.

3. The method of claim 1, wherein the processing the received data further includes at least one of seismic data conditioning and log data conditioning, wherein the seismic data and log data are 1D.

4. The method of claim 1, further comprising:
   de-risking, by the at least one computing device, the stratigraphic data.

5. The method of claim 1, further comprising:
   representing, by the at least one computing device, horizon and fault interpretations.

6. The method of claim 1, further comprising:
applying, by the at least one computing device, seismic inversion to identify a feature of interest.

7. The method of claim 1, further comprising:
generating, by the at least one computing device, an image of a stratigraphic play; and
blending, by the at least one computing device, the image of the stratigraphic play with seismic derived reservoir properties to highlight targeted areas.

8. The method of claim 1, further comprising:
isolating, by the at least one computing device, a potential stratigraphic play area.

9. The method of claim 1, further comprising:
correlating, by the at least one computing device, at least some of the received data representing information from cored wells and information from non-cored wells to create the 2D model.

10. The method of claim 1, further comprising:
transforming, by the at least one computing device as a function of seismic inversion, seismic amplitudes to information representing rock properties.

11. The method of claim 1, further comprising:
matching, by that at least one computing device as a function seismic forward modeling, information representing geological parameters to a seismic amplitude response.

12. A computer-implemented stratigraphic play quality generation system, the system comprising:
at least one computing device having access to instructions on non-transitory processor readable media that, when executed by the at least one computing device, configure the at least one computing device to:
i) receive, data including seismic data and log data, respectively received from each of a plurality of respective data sources, wherein at least some of the seismic data include stratigraphic data;
ii) process, using at least one of an imperial, statistical, and machine learning technique, at least some wireline data included in the log data to correct for a borehole condition associated with a geologic area and to predict missing wireline data;
iii) determine, using the processed wireline data, seismic attributes including structural attributes and stratigraphic attributes;
iv) apply machine learning to generate a model from at least some of the received data to determine at least one seismic surface and at least one structural element;
iv) transform, using a seismic sequence model, at least some of the received data into a relative geological time model;
vi) determine, using the relative geological time model, attributes of at least one seismic sequence including by decomposing a signal included in the received data into component frequencies and applying an additive color model;
vii) derive from the seismic attributes a parameter respectively representing at least one of frequency, attenuation, amplitude character, and time;
viii) link reservoir properties associated with the geologic area to elastic properties associated with the geologic area;
ix) build, a seismic forward model having 2D synthetic sections that are populated with properties from log data, wherein the seismic forward model represents at least one stratigraphic feature of interest associated with the geologic area; and x) process at least some of the seismic forward model to increase resolution and to generate as a function of the increased resolution, the attributes of the at least one seismic sequence, and the derived parameter, a 3D map that is usable for a prospective drilling plan.

13. The system of claim 12, wherein the at least one computing device further has access to instructions that, when executed by the at least one computing device, configure the at least one computing device to use at least one of seismic sequence stratigraphy, rock physics, seismic inversion, and machine learning for:
extracting the attributes of at least one seismic sequence;
determining the at least one seismic surface and the at least one structural element;
ascertaining the subsurface of the geologic area;
linking the reservoir properties to elastic properties;
building the 2D model; and
generating the 3D map.

14. The system of claim 12, wherein the processing the received data further includes at least one of seismic data conditioning and log data conditioning, wherein the seismic data and log data are 1D.

15. The system of claim 12, wherein the at least one computing device further has access to instructions that, when executed by the at least one computing device, configure the at least one computing device to:
de-risk the stratigraphic data.

16. The system of claim 12, wherein the at least one computing device further has access to instructions that, when executed by the at least one computing device, configure the at least one computing device to:
represent horizon and fault interpretations.

17. The system of claim 12, wherein the at least one computing device further has access to instructions that, when executed by the at least one computing device, configure the at least one computing device to:
apply seismic inversion to identify a feature of interest.

18. The system of claim 12, wherein the at least one computing device further has access to instructions that, when executed by the at least one computing device, configure the at least one computing device to:
generate an image of a stratigraphic play; and
blend the image of the stratigraphic play with seismic derived reservoir properties to highlight targeted areas.

19. The system of claim 12, wherein the at least one computing device further has access to instructions that, when executed by the at least one computing device, configure the at least one computing device to:
isolate a potential stratigraphic play area.

20. A non-transitory computer storage medium encoded with a computer program, the program comprising instructions that when executed by one or more data processing apparatus cause the one or more data processing apparatus to perform operations for stratigraphic play quality generation, the operations comprising:
i) receiving, by data processing apparatus, data including seismic data and log data, respectively received from each of a plurality of respective data sources, wherein at least some of the seismic data include stratigraphic data;
ii) processing, by the data processing apparatus using at least one of an imperial, statistical, and machine learning technique, at least some wireline data included in the log data to correct for a borehole condition associated with a geologic area and to predict missing wireline data;

iii) determining, by the data processing apparatus using the processed wireline data, seismic attributes including structural attributes and stratigraphic attributes;

iv) applying, by the data processing apparatus, machine learning to generate a model from at least some of the received data to determine at least one seismic surface and at least one structural element;

v) transforming, by the data processing apparatus using a seismic sequence model, at least some of the received data into a relative geological time model;

vi) determining, by the data processing apparatus using the relative geological time model, attributes of at least one seismic sequence including by decomposing a signal included in the received data into component frequencies and by applying an additive color model;

vii) deriving from the seismic attributes, by the data processing apparatus, a parameter respectively representing at least one of frequency, attenuation, amplitude character, and time;

viii) linking, by the at least one computing device, reservoir properties associated with the geologic area to elastic properties associated with the geologic area;

ix) building, by the data processing apparatus, a seismic forward model having 2D synthetic sections that are populated with properties from log data, wherein the model represents at least one stratigraphic feature of interest associated with the geologic area; and x) processing, by the data processing apparatus, at least some of the seismic forward model to increase resolution and to generate, by the at least one computing device as a function of the increased resolution, the attributes of the at least one seismic sequence, and the derived parameter, a 3D map that is usable for a prospective drilling plan.

* * * * *